(12) United States Patent
Steinbring

(10) Patent No.: US 9,038,563 B1
(45) Date of Patent: May 26, 2015

(54) APPARATUS AND METHOD FOR INDICATING PARKING BRAKE NON-ENGAGEMENT

(76) Inventor: David B. Steinbring, Johnstown, PA (US)

( * ) Notice: Subject to any disclaimer, the term of this patent is extended or adjusted under 35 U.S.C. 154(b) by 800 days.

(21) Appl. No.: 13/232,080

(22) Filed: Sep. 14, 2011

Related U.S. Application Data

(63) Continuation-in-part of application No. 12/276,464, filed on Nov. 24, 2008, now abandoned.

(51) Int. Cl.
*B60T 13/00* (2006.01)
*B60Q 1/44* (2006.01)

(52) U.S. Cl.
CPC ..................... *B60Q 1/441* (2013.01)

(58) Field of Classification Search
CPC ............ B60Q 1/44; B60T 17/22; B60T 13/00
USPC ............ 116/58 A; 303/122.15; 180/271–272; 340/438
See application file for complete search history.

(56) References Cited

U.S. PATENT DOCUMENTS

| | | | | |
|---|---|---|---|---|
| 2,100,970 A * | 11/1937 | MacMullen | ..................... | 188/31 |
| 2,740,947 A * | 4/1956 | Davies | ........................... | 180/273 |
| 3,381,269 A * | 4/1968 | Fierbaugh et al. | ............ | 340/457 |
| 3,651,457 A * | 3/1972 | Sprouse | ...................... | 340/457.3 |
| 4,967,182 A * | 10/1990 | Foster | ......................... | 340/457.3 |
| 5,050,700 A * | 9/1991 | Kim | ............................... | 180/268 |
| 5,664,637 A * | 9/1997 | Ohta et al. | ..................... | 180/286 |
| 5,921,612 A * | 7/1999 | Mizuki et al. | .................. | 296/155 |
| 6,124,789 A * | 9/2000 | Barr | ............................... | 340/457 |
| 6,182,781 B1 * | 2/2001 | Beom | ........................... | 180/271 |
| 6,234,525 B1 * | 5/2001 | Schroder et al. | ............... | 280/748 |
| 6,246,313 B1 * | 6/2001 | Baker et al. | ............... | 340/425.5 |
| 6,406,102 B1 * | 6/2002 | Arnold | ............................ | 303/20 |
| 7,059,690 B1 * | 6/2006 | Pinkston | ................... | 303/122.15 |
| 2003/0075981 A1 * | 4/2003 | Chen | ............................. | 307/10.1 |
| 2004/0099461 A1 * | 5/2004 | Miiller et al. | .................. | 180/272 |
| 2007/0080579 A1 * | 4/2007 | Steinbring | ..................... | 303/6.1 |
| 2012/0019376 A1 * | 1/2012 | Kwon et al. | ................ | 340/457.3 |

* cited by examiner

*Primary Examiner* — R. A. Smith
*Assistant Examiner* — Tania Courson
(74) *Attorney, Agent, or Firm* — John J. Elnitski, Jr.

(57) ABSTRACT

A parking brake engagement indicator for a parking brake system on a commercial truck wherein an indicator bar is mounted on the truck and is moveable between a position of impediment between the driver's outside lower leg portion and the driver's side exit doorframe of the truck, to a second position of non-impediment. The indicator bar is connected to the parking brake system whereby the bar is manipulated by the brake system itself to the position of impediment when the parking brake is disengaged and the bar is manipulated by the brake system to the position of non-impediment when the parking brake is engage.

17 Claims, 30 Drawing Sheets

| Note | Item | Part Name | Reference Information | Ref Dwg | Qty. | Type | Rel | REV |
|---|---|---|---|---|---|---|---|---|
| A | 1 | ACTUATOR SWITCH | PART NO. JE-5 | N/A | 3 | PART | WIP | -.0 |
| B | 2 | DOUBLE MINI RELAY | PART NO. 1393267-2 | TBD | 1 | PART | WIP | -.0 |
| C | 3 | FLAT HD SOCKET SCR .164-32 UNC-2A X .25 LG | PART NO. 92216A150 | TBD | 4 | PART | WIP | -.0 |
| D | 4 | GEAR MOTOR | PART NO. MOD-7000D-DCM | GEAR-HEAD-MOTOR-7000DC | 1 | PART | WIP | -.0 |
|  | 5 | GUARD BAR END | HIGH DENSITY POLYETHYLENE | TBD | 1 | PART | WIP | -.0 |
|  | 6 | GUARD BAR PIVOT | HIGH DENSITY POLYETHYLENE | TBD | 1 | PART | WIP | -.0 |
|  | 7 | HOUSING BACK COVER | INJECTION MOLDED ABS | N/A | 1 | PART | WIP | -.0 |
|  | 8 | HOUSING FRONT COVER | INJECTION MOLDED ABS | N/A | 1 | PART | WIP | -.0 |
|  | 9 | HOUSING MOUNTING BRACKET | SST .062 THK SHEET | FS_ASSY_MNT_BRACKET | 1 | PART | WIP | -.0 |
|  | 10 | LIMIT SWITCH CAM | SST | TBD | 1 | PART | WIP | -.0 |
|  | 11 | LIMIT SWITCH MOUNTING PLATE | INJECTION MOLDED ABS | FS_LIMIT_SWITCH_MNT_PLAT | 1 | PART | WIP | -.0 |
|  | 12 | LOWER LIMIT SWITCH MOUNT BRACKET | INJECTION MOLDED ABS | TBD | 1 | PART | WIP | -.0 |
| C | 13 | MACH SCR #2-56 UNC-2A X .625 LG PAN HD | PART NO. 91792A082 | TBD | 6 | PART | WIP | -.0 |
| C | 14 | MACH SCR #4-40 UNC PAN HD TAMPER RESISTANT | PART NO. 94066A138 | N/A | 8 | PART | WIP | -.0 |
| C | 15 | MACH SCR #5-40 UNC PHILLIPS PAN HD | PART NO. 91772A128 | N/A | 2 | PART | WIP | -.0 |
| C | 16 | MACH SCR HEX NUT #2-56 UNC | PART NO. 91841A003 | N/A | 6 | PART | WIP | -.0 |
| C | 17 | MACH SCR HEX NUT #4-40 UNC | PART NO. 91841A005 | N/A | 8 | PART | WIP | -.0 |
| C | 18 | MACH SCR #2-56 UNC-2A X .313 LG PAN HD | PART NO. 91792A078 | N/A | 2 | PART | WIP | -.0 |
| A | 19 | MICRO SWITCH | PART NO. 1SE1 | N/A | 3 | PART | WIP | -.0 |
|  | 20 | PCB FAIL-SAFE-DC-PCB01 | 2.28 X 2.06 PCB | TBD | 1 | PART | WIP | -.0 |
| E | 21 | SEALED RIGHT ANGLE PCB HEADER | MOLEX PART NO. 19427-0017 |  | 1 | PART | WIP | -.0 |
| C | 22 | SET SCREW .164-32 UNC-2A X .188 LG | PART NO. 94355A182 | N/A | 4 | PART | WIP | -.0 |
|  | 23 | SLIP CLUTCH EXTENSION SHAFT | SST 18-8 | TBD | 1 | PART | WIP | -.0 |
| C | 24 | SOCKET HD CAP SCREW .164-32 UNC-2A X .375 LG | PART NO. 92196A192 | N/A | 2 | PART | WIP | -.0 |
| C | 25 | SOCKET HD CAP SCREW .190-24 UNC-2A X .25 LG | PART NO. 92196A309 | N/A | 4 | PART | WIP | -.0 |
| C | 26 | SOCKET HD CAP SCREW .190-32 UNF-2A X .625 LG | PART NO. 92196A271 | N/A | 2 | PART | WIP | -.0 |
| F | 27 | SPRING HINGE | PART NO. TBD | TBD | 1 | ASSEMBLY | WIP | -.0 |
| G | 28 | SPRING WRAPPED SLIP CLUTCH | PART NO. S99401-SWC22A06 | SLIP-CLUTCH | 1 | PART | WIP | -.0 |
|  | 29 | UPPER LIMIT SWITCH MOUNT BRACKET | INJECTION MOLDED ABS | TBD | 1 | PART | WIP | -.0 |

A - MICRO SWITCH, DIVISION OF MINNEAPOLIS HONEYWELL REGULATOR CO., FREEPORT, ILLINOIS
B - TYCO ELECTRONICS,
C - McMASTER CARR, PO BOX 94930, CLEVELAND, OH44101-4930
D - MULTIPRODUCTS COMPANY, INC., 5301 21st ST., RACINE, WI 53406
E - NEWARK ELECTRONIC COMPONENTS DISTRIBUTOR, 4801 N. RAVENSWOOD, CHICAGO, ILL 606400-4496
F - MIDLAKE PRODUCTS & MFG, 819 N. NICKELPLATE, LOUISVILLE, OH 44641
G - STERLING INSTRUMENT, 2101 JERICHO TURNPIKE, BOX 5416, NEW HYDE PARK, NY 11040-5416

Fig. 9

APPARATUS AND METHOD FOR INDICATING PARKING BRAKE NON-ENGAGEMENT

This application is a continuation-in-part application of U.S. patent application Ser. No. 12/276,464 filed on Nov. 24, 2008 and claims the benefit of and incorporates by reference U.S. patent application Ser. No. 12/276,464.

BACKGROUND

The present invention relates generally to a braking systems, and more particularly to a safety indicator for parking brake systems which indicates to the driver of a commercial truck that the parking brake is not engaged.

A severe safety hazard has arisen with regard to the application of parking brakes on commercial trucks which make frequent stops or pickup, such as delivery trucks and waste hauling trucks or garbage trucks. These trucks generally have pneumatically operated parking brake systems which the drivers are required to engage each time they leave the truck cab to make a pickup, a rest stop, or for other purposes. As a result severe accidents have occurred wherein the unattended vehicle rolls away creating severe damage and even resulting sometimes in severe injury or death to pedestrians.

Various systems have been developed over the years in an attempt to avoid this problem. For example, one system, such as shown in U.S. Pat. No. 6,758,298, automatically applies the parking brake when the driver's not seated. However, this is problematic as a driver might momentarily rise, or be caused to rise from the driver's seat thereby inappropriately activating the system and of course such a system would not work in the truck cabs wherein no seat is provided for the driver and the driver is always in a standing position. For example, this is sometimes the situation with short delivery route trucks. Another system prevents the vehicle door from opening until the parking brake is set. For example, see U.S. Pat. No. 4,546,845. This reference applies to train doors, but nevertheless, even if incorporated in a truck this could be disastrous in an accident situation wherein the driver would be prevented from escaping from the vehicle.

U.S. Pat. No. 6,234,525 discloses a driver restraint device in the form of a pivoting bar that acts as a safety harness belt. The safety belt restraining device is configured to release the parking brake as a function of the position of the bar/seatbelt combination. Such a device simply is not practical for trucks wherein the driver must make frequent exits from the cab, such as is the situation for waste pickup trucks.

Accordingly, it is a principal object of the present invention to provide a system which definitely reminds the operator of the truck to set the parking brake for exiting the vehicle, yet does not hinder an escape from the cab in the event of an emergency, and further provides a system which is devoid of the aforementioned disadvantages.

SUMMARY OF THE INVENTION

The present invention provides an apparatus and method for definitely indicating to the driver of a commercial truck that the parking brake is not engaged. The indicator is comprised of a bar mounted on the truck, wherein the bar is moveable between a position of impediment between the driver's outside lower leg portion and the driver's side exit doorframe of the truck, and a second position of non-impediment. The bar is connected to the parking brake system whereby the bar is manipulated by the brake system itself in the position of impediment when the parking brake is disengaged, and the bar is manipulated by the brake system to the position of non-impediment when the parking brake is engaged.

In a pneumatically operated brake system, after the vehicle is started and air pressure has built up and the parking brake plunger or actuator is in the D-actuated position, air is supplied to air canisters that release the parking brake on the rear wheels of the vehicle, and at the same time air under pressure is also supplied to an air cylinder motor operating the indicator bar causing the bar to be biased to the position of impediment. When the parking brake plunger knob is pulled out on the vehicle dash board to actuate the parking brake, air under pressure is then cutoff and no longer supplied to the brake canisters. The spring loaded parking brake then engages with the rear wheels making the vehicle immobile and since no air is being supplied also to the operating cylinder for the indicator bar if pivoted, drops to the vertical position or if horizontally extended is retracted under spring bias.

Accordingly, the operator of the commercial truck is positively reminded by the impeding bar that the parking brake has not been set when attempting to exit the cab, yet the impediment of the bar is such that it does not prevent the operator from escaping from the vehicle in the event of an accident.

BRIEF DESCRIPTION OF DRAWINGS

FIG. 9 is a parts chart for FIG. 6 according to the present invention.

DETAILED DESCRIPTION

Figure 1:
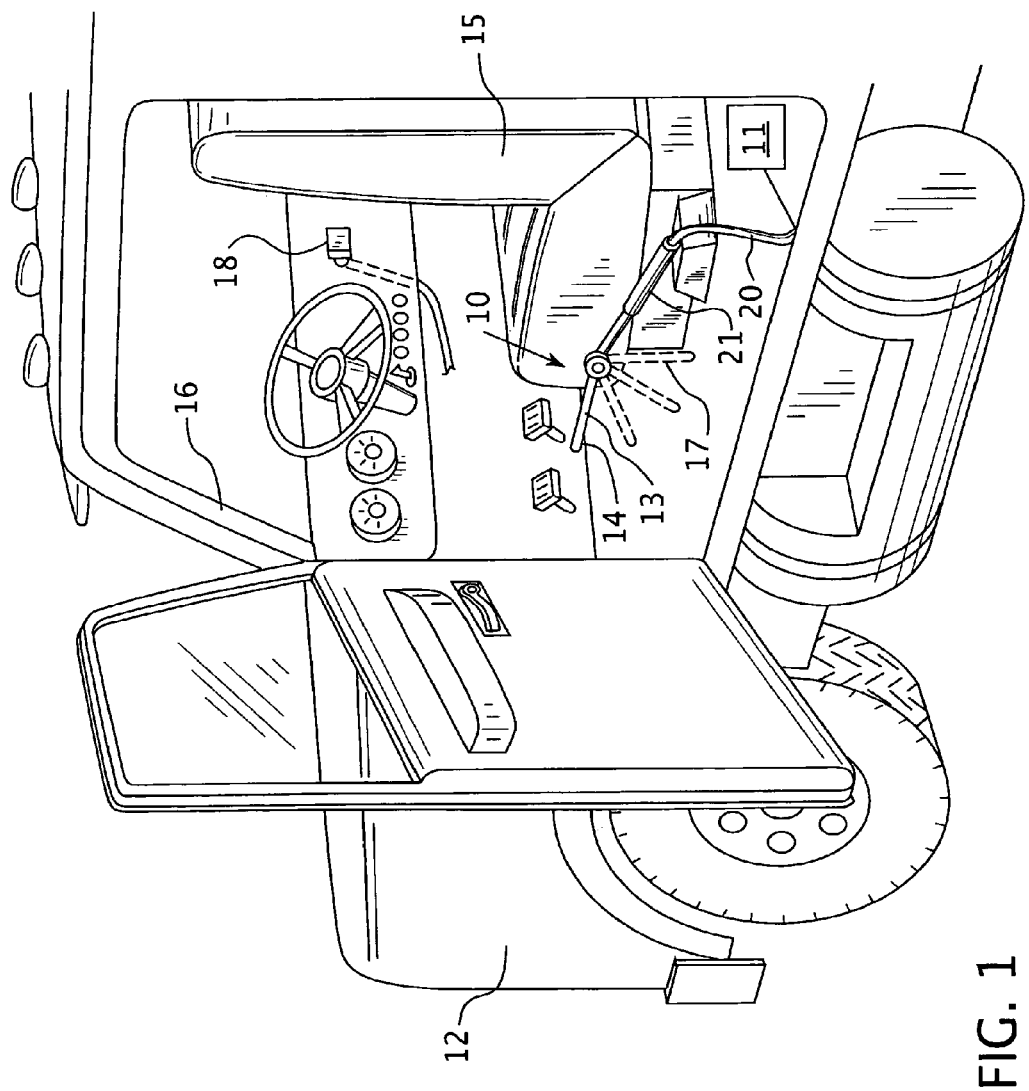
FIG. 1 shows one embodiment of the parking brake engagement indicator of the present invention.

Referring to FIG. 1, the parking brake engagement indicator 10 for parking brake system 11, which is schematically illustrated, on the commercial truck 12 is comprised of an indicator bar 13 mounted on the truck wherein bar 13 is pivotally moveable between a position of impediment 14 between a driver's outside leg portion (not shown) when seated in the driver's seat 15, and driver's side exit doorframe 16 of truck 12, and to a second position of non-impediment as indicated at 17. The parking brake system 11 is of a conventional type which is pneumatically operated and the pneumatically operated parking brake 11 is engaged by pulling out plunger 18 on the dashboard of the truck 12. When the parking brake system 11 is not actuated, air under pressure is supplied to pneumatic motor cylinder 21 which moves and maintains bar to and in the position of impediment 13. However, when the parking brake system 11 is engaged by pulling plunger 18, air under pressure is released through conduit 20 from the motor cylinder 21 which causes the bar 13 to pivotally drop from its position of impediment 14 to its position of non-impediment 17.

When bar 13 is in the position of impediment as indicated at 14 it is adjacent the lower portion of driver's leg somewhere between knee level and ankle level. Thus when the operator attempts to leave the cab of the truck 12, his lower leg engages the bar 13 thereby providing him a positive reminder that he must first apply the parking brake. Nevertheless, in the case of an emergency, the driver is still able to escape the vehicle cab by stepping over the bar 13 in its position of impediment 14.

Figure 2:
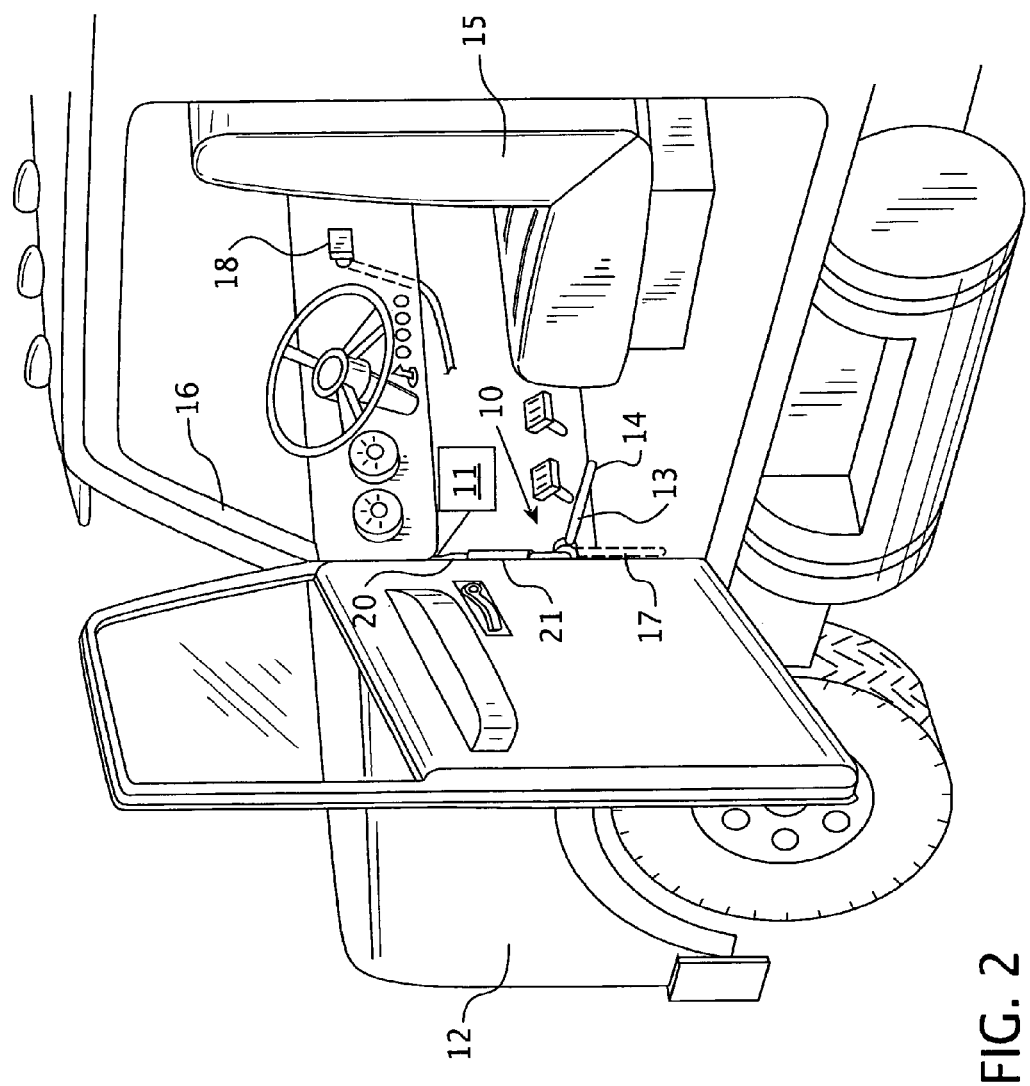
FIG. 2 shows a second embodiment of the indicator of the present invention.
Figure 3:
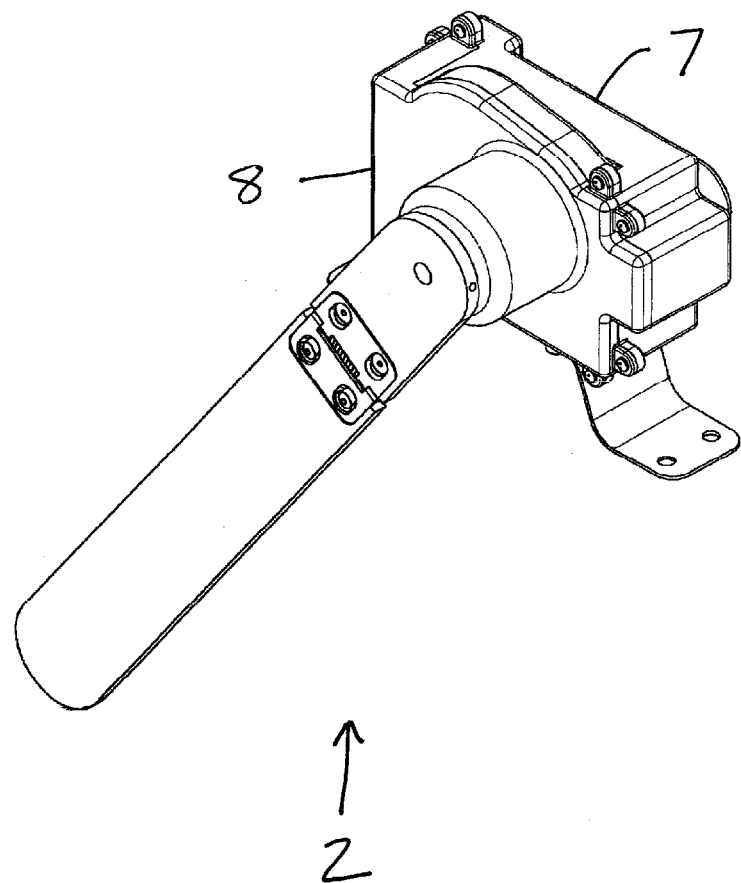
FIG. 3 is perspective view of a third embodiment according to the present invention.
Figure 4:
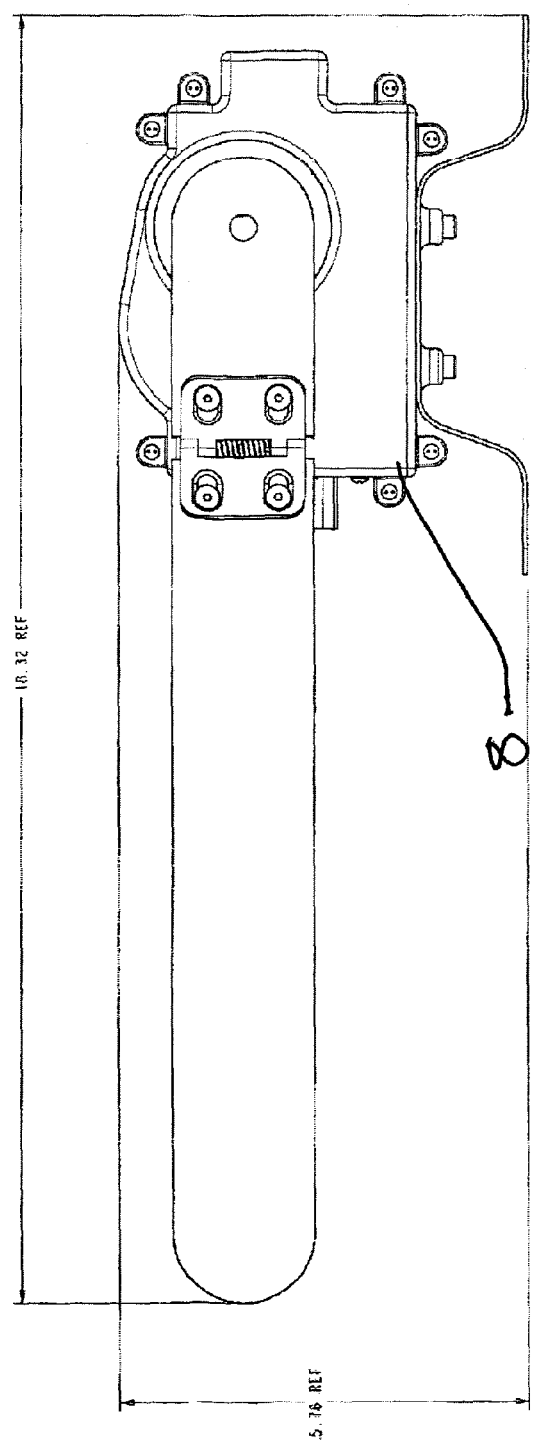
FIG. 4 is a side view of the third embodiment according to the present invention.
Figure 5:
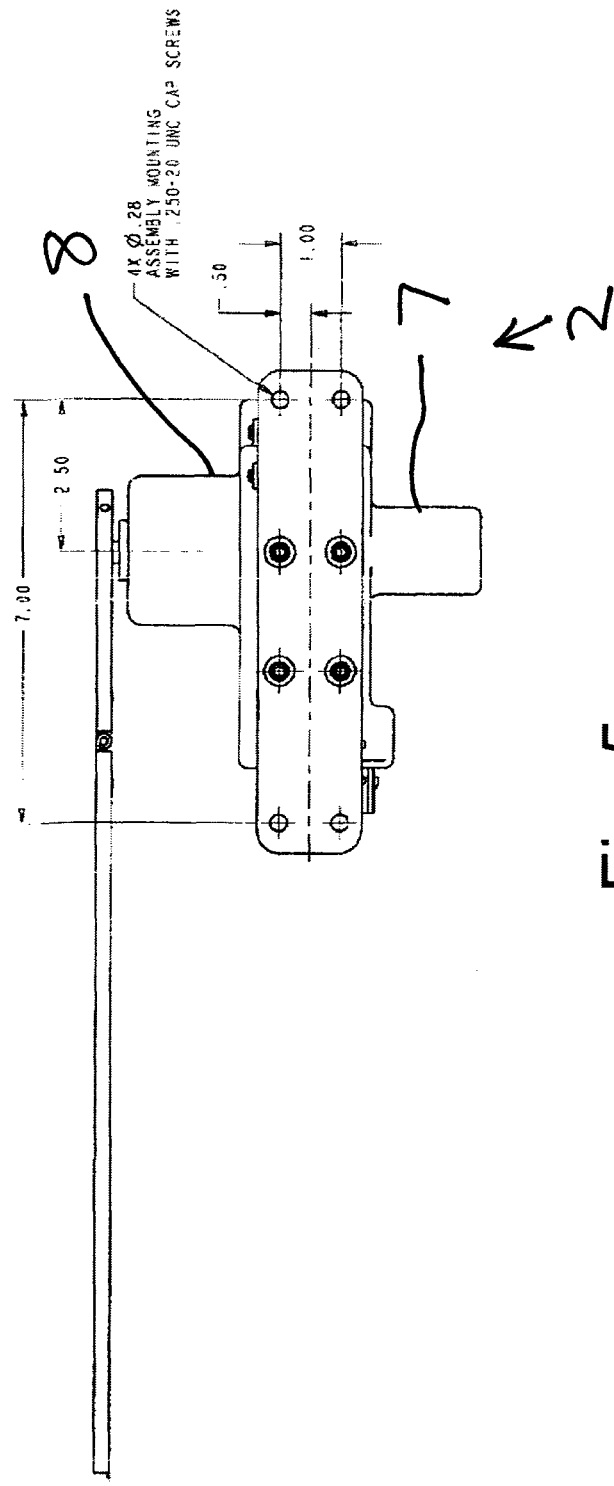
FIG. 5 is a bottom view of the third embodiment according to the present invention.

The configuration shown in FIG. 2 operates in an identical manner, however in this situation the bar 13 is pivoted adjacent the firewall of the cab, instead of being pivoted adjacent the seat frame of the cab. As an alternative, the bar 13 need not be pivoted but may instead be mounted whereby it horizontally projects or protrudes outwardly to the position of impediment 14 and then horizontally retracts under spring bias to a position of non-impediment.

Figure 6:
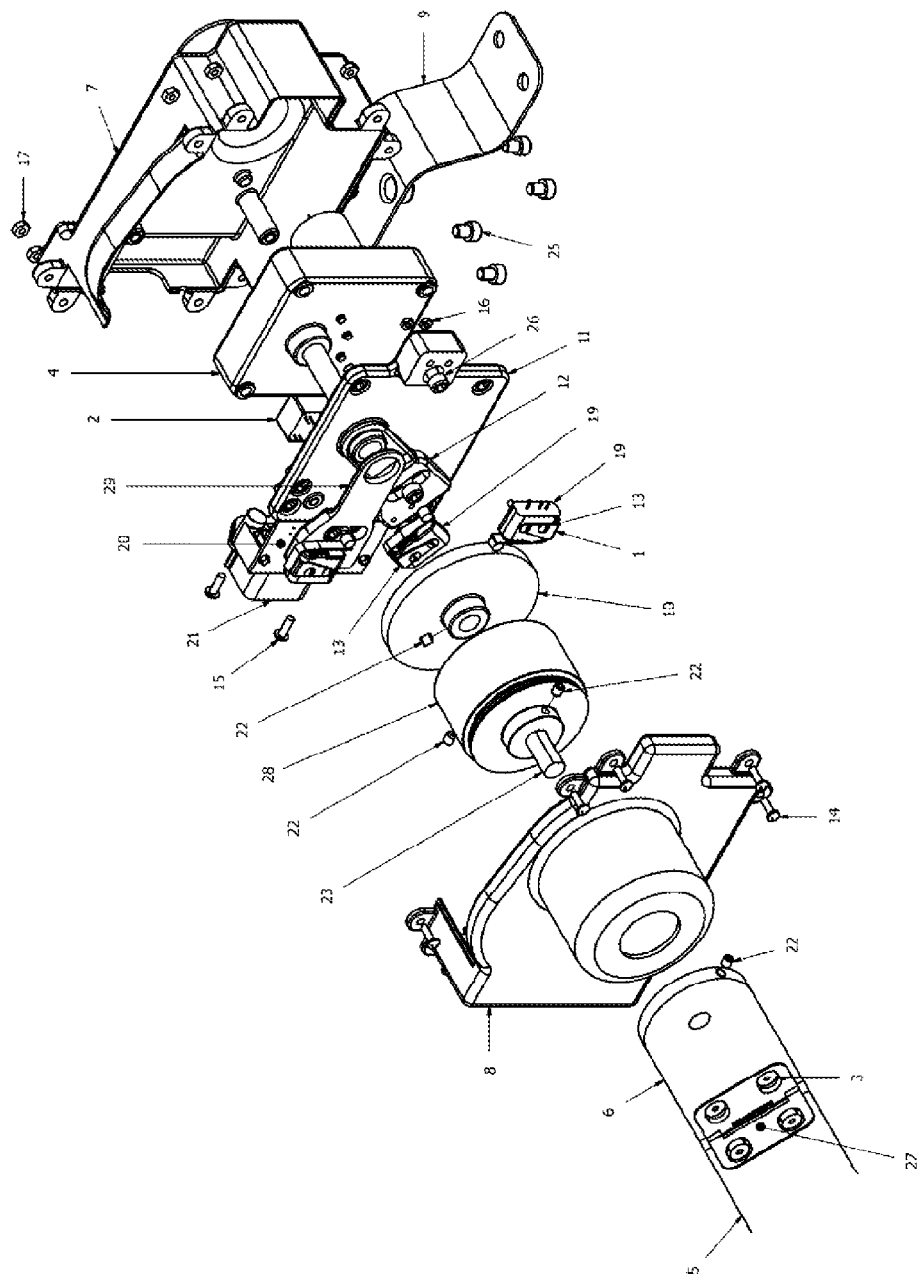
FIG. 6 is an exploded view of the third embodiment according to the present invention.
Figure 7:
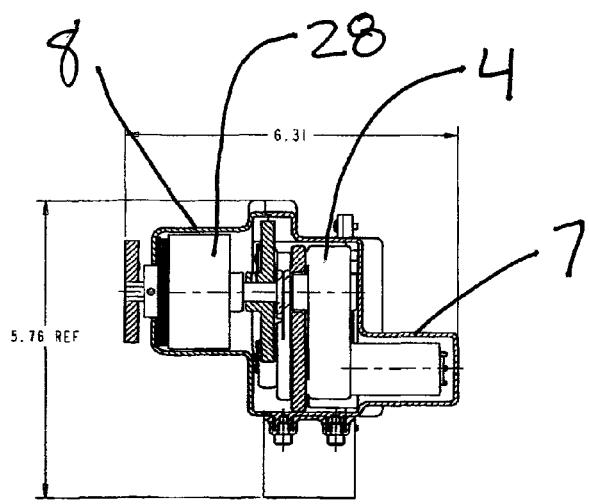
FIG. 7 is a side view of the third embodiment according to the present invention.
Figure 8:
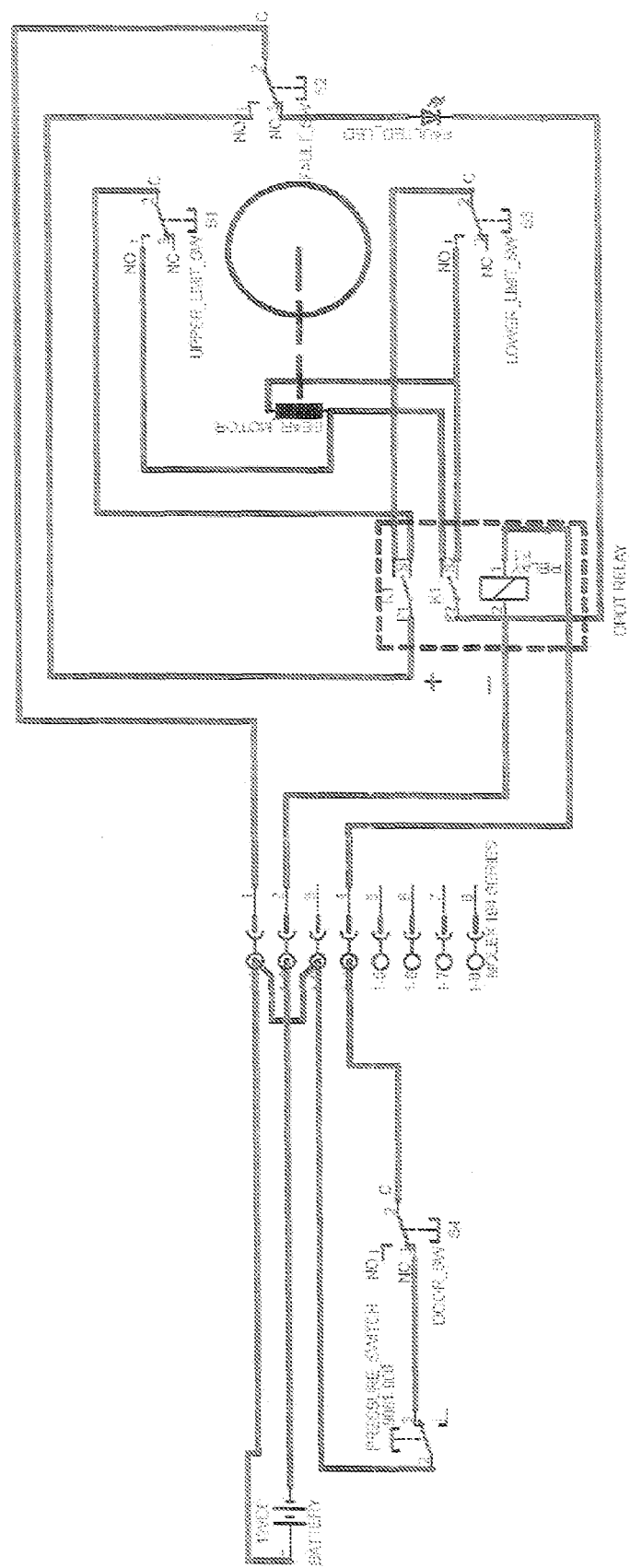
FIG. 8 is an electrical schematic for the third embodiment according to the present invention.
Figure 10:
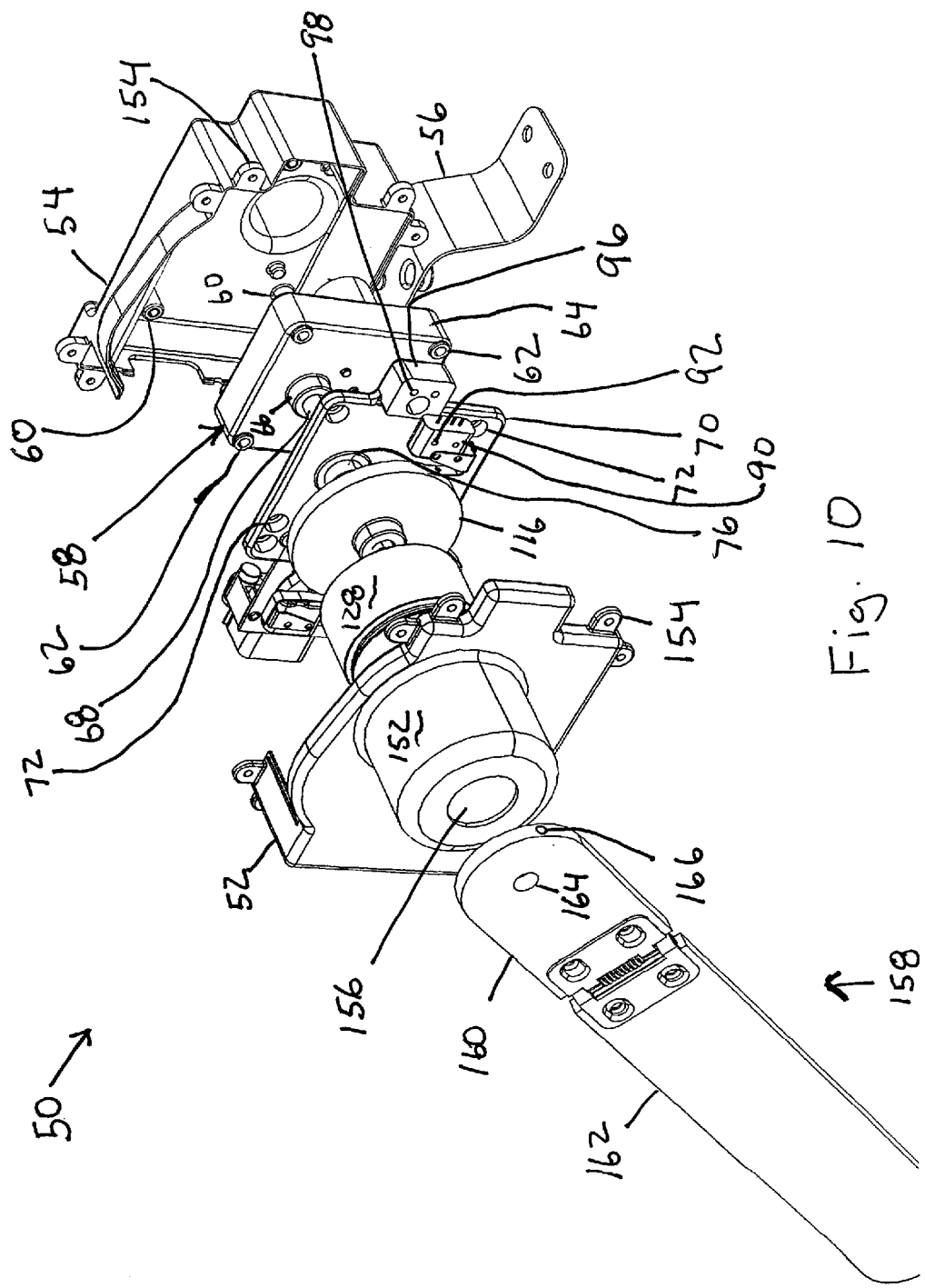
FIG. 10 is perspective exploded view of a fourth embodiment according to the present invention.
Figure 11:
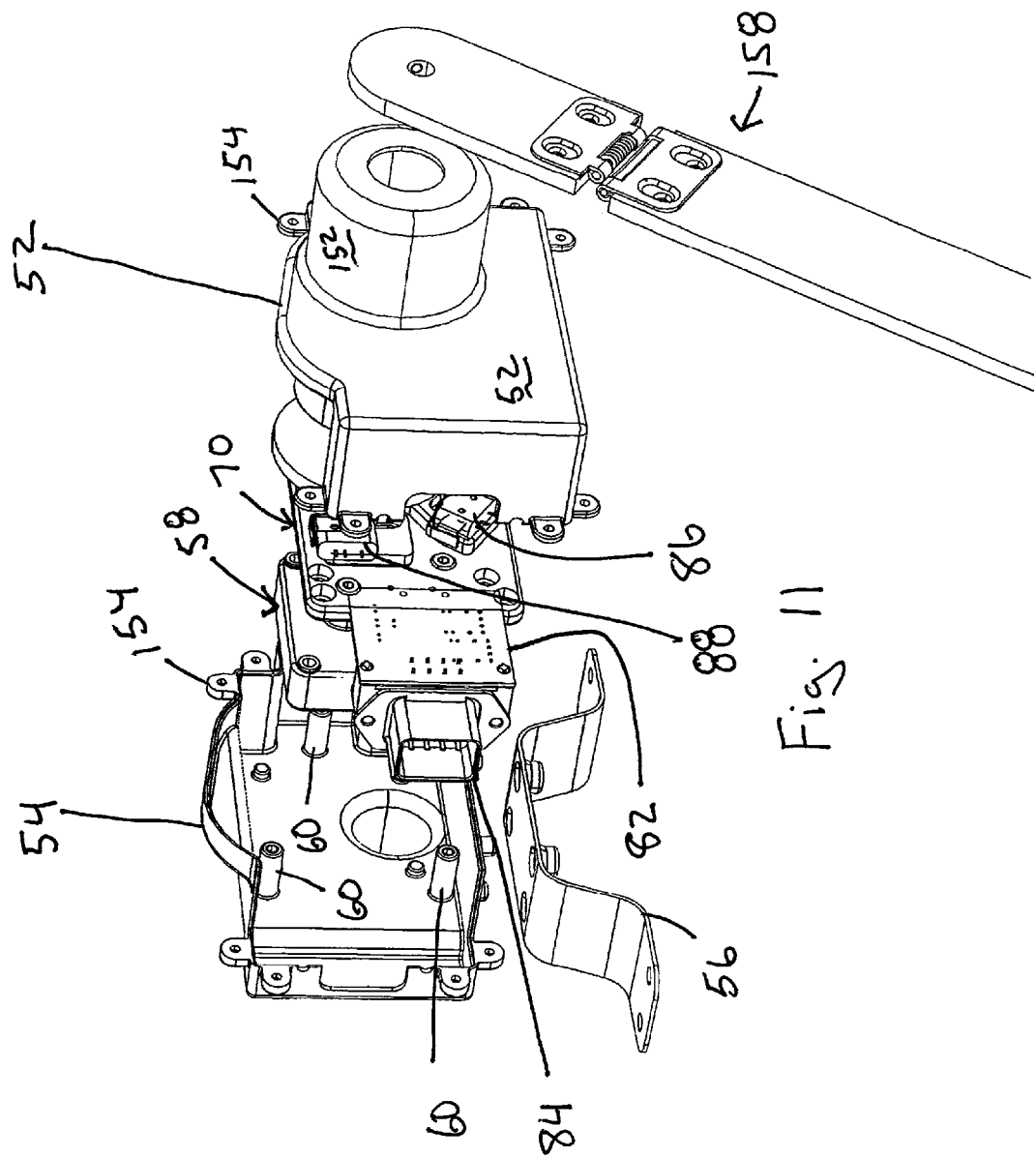
FIG. 11 is perspective exploded view of a fourth embodiment according to the present invention.
Figure 12:
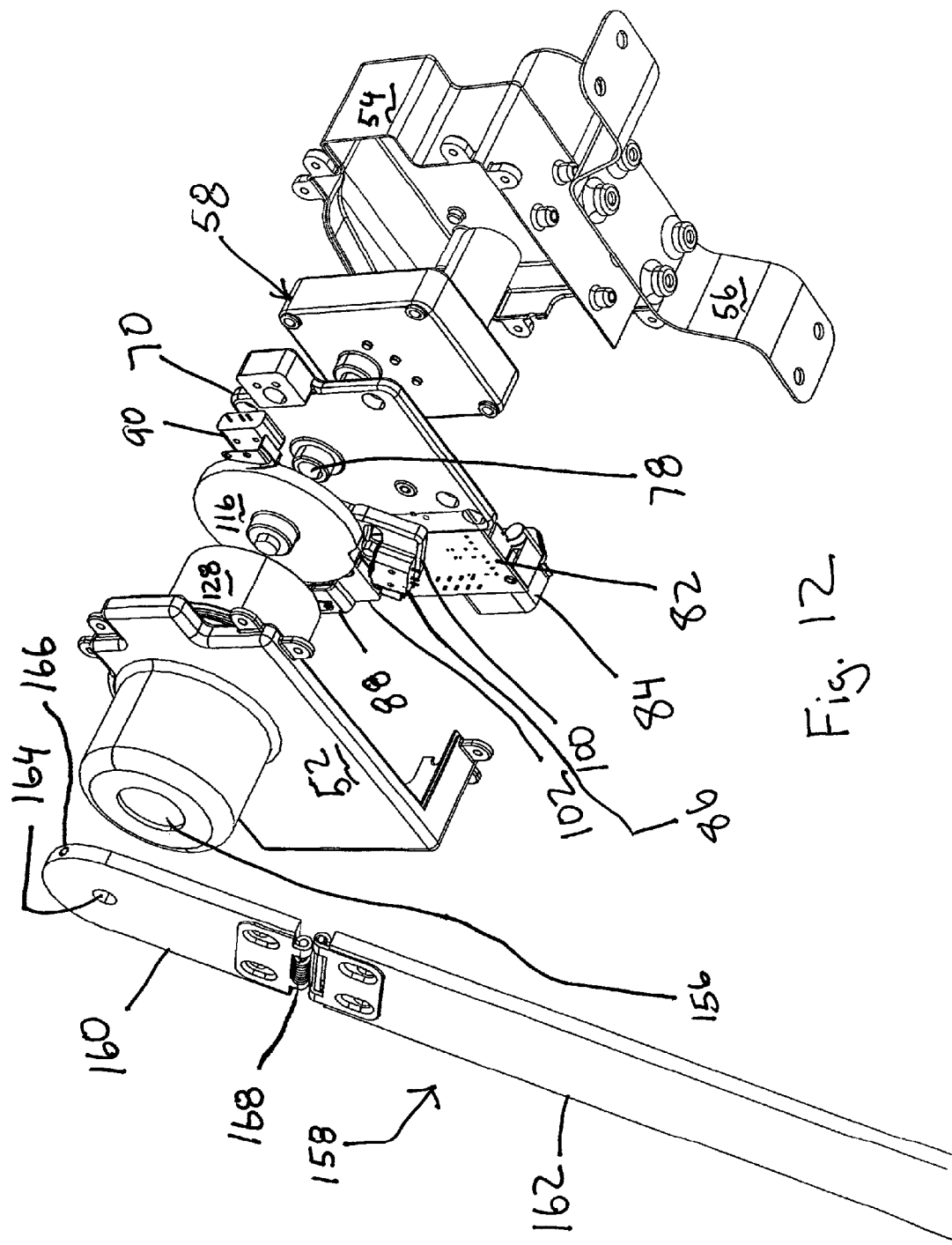
FIG. 12 is perspective exploded view of a fourth embodiment according to the present invention.
Figure 13:
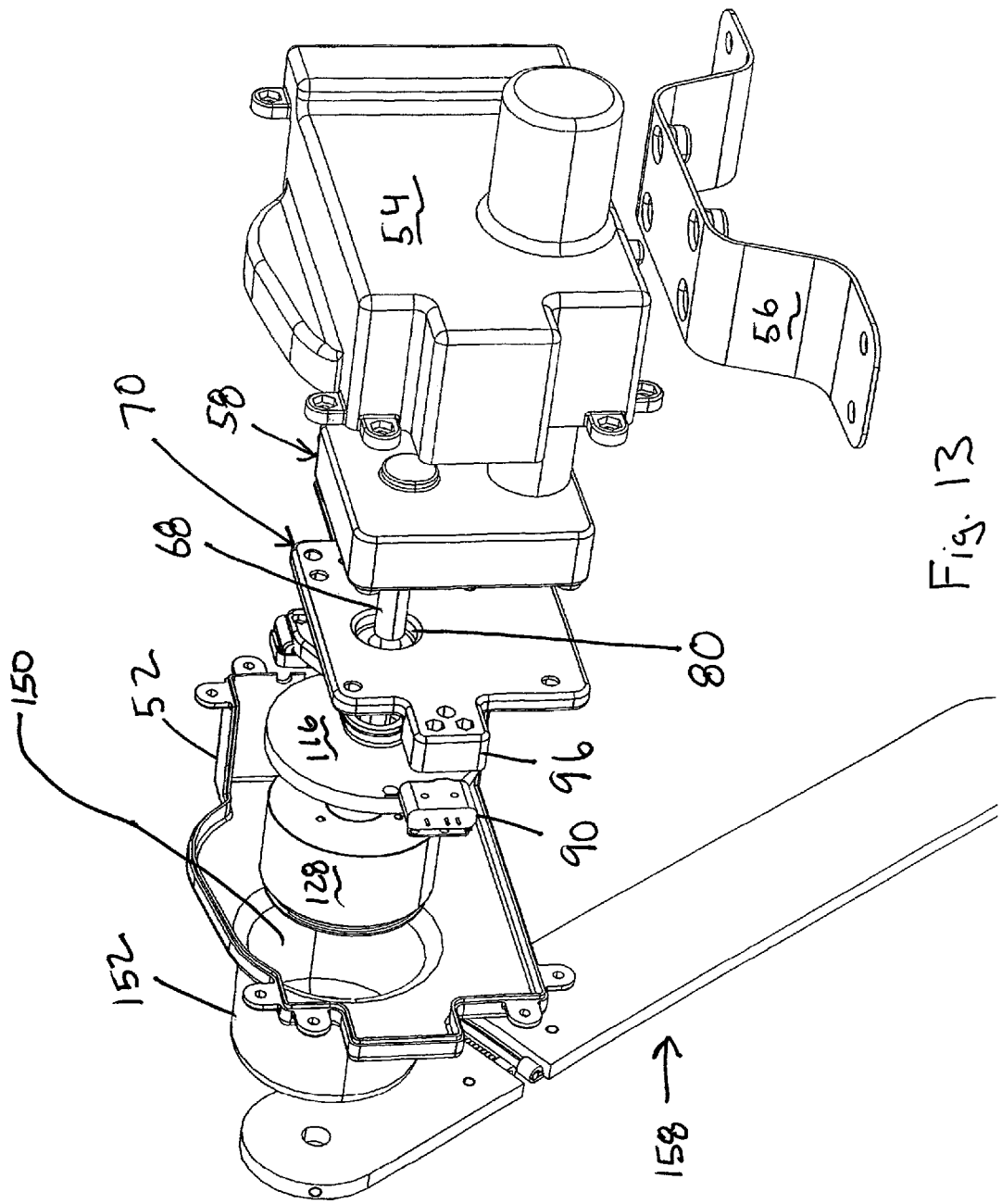
FIG. 13 is perspective exploded view of a fourth embodiment according to the present invention.

FIGS. 3-6 and 7 show a third embodiment 2 of the present invention which includes a slip clutch, limiting switches and a gear motor. The spring wrapped slip clutch 28 shown in FIGS. 6 and 7 are enclosed by covers 8, 7 shown in FIGS. 3 and 5-7 with the gear motor 4 shown in FIGS. 6-7. FIG. 8 shows electrical schematic for the third embodiment. FIG. 9 shows a chart of part numbers associated with other components of embodiment 2 that are shown in FIG. 6.

Figure 14:
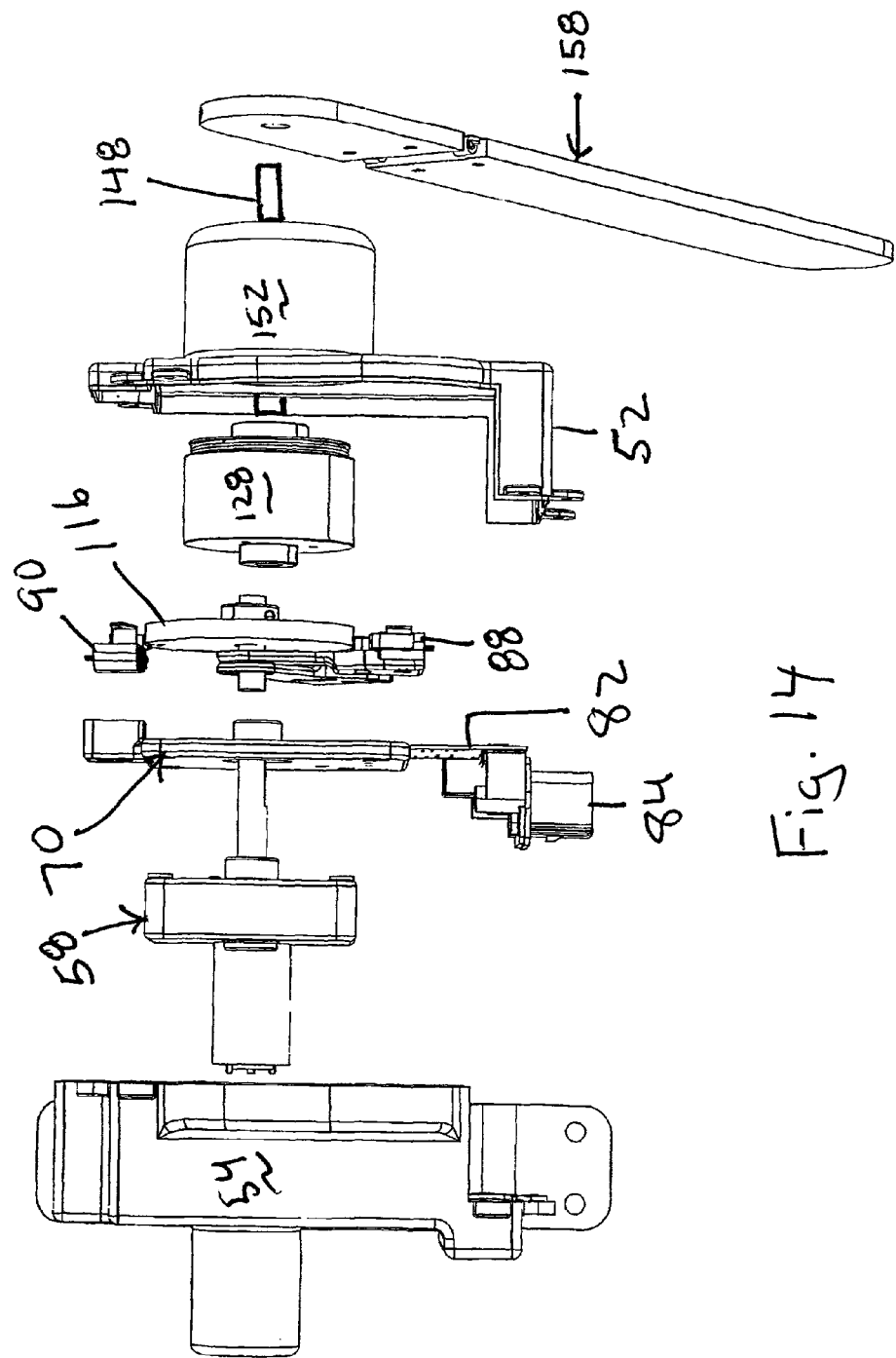
FIG. 14 is bottom exploded view of a fourth embodiment according to the present invention.
Figure 15:
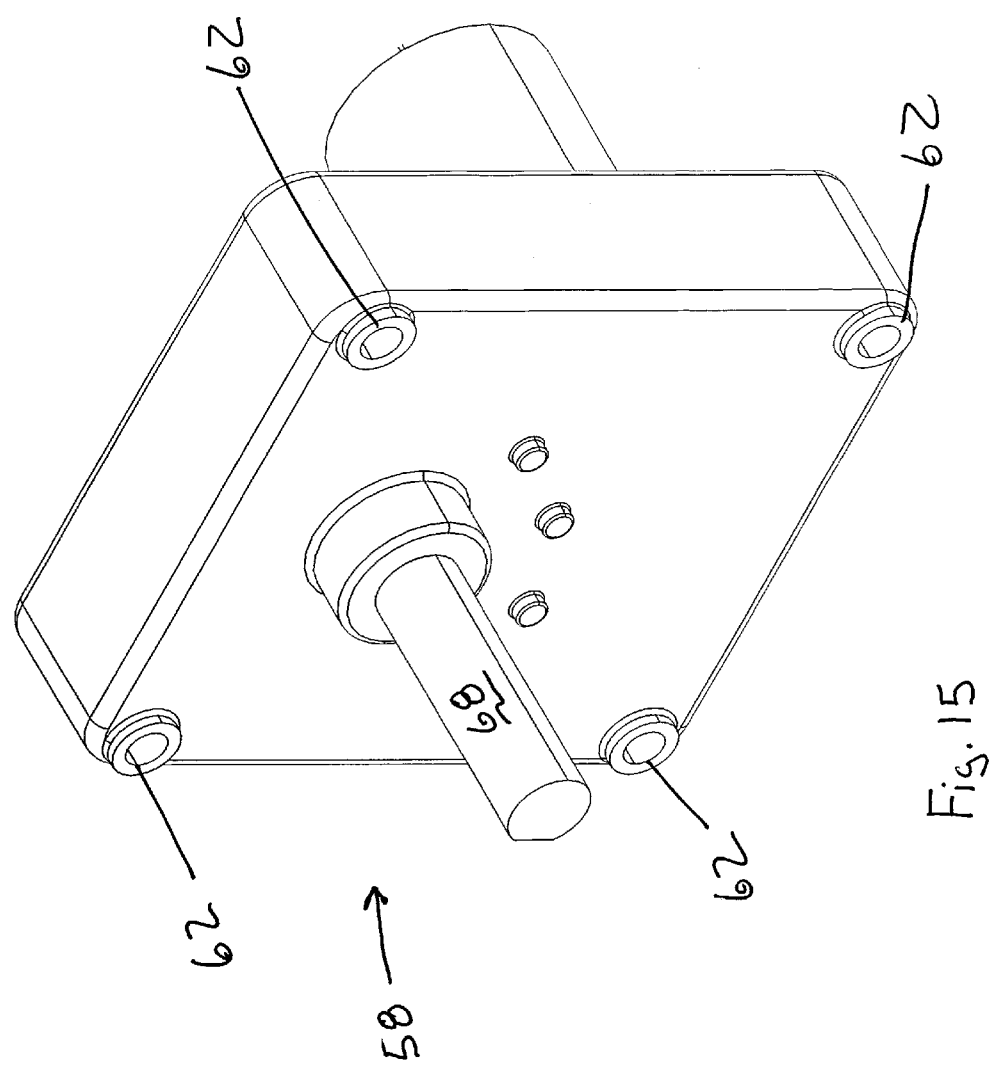
FIG. 15 is perspective view of a motor assembly according to the present invention.
Figure 16:
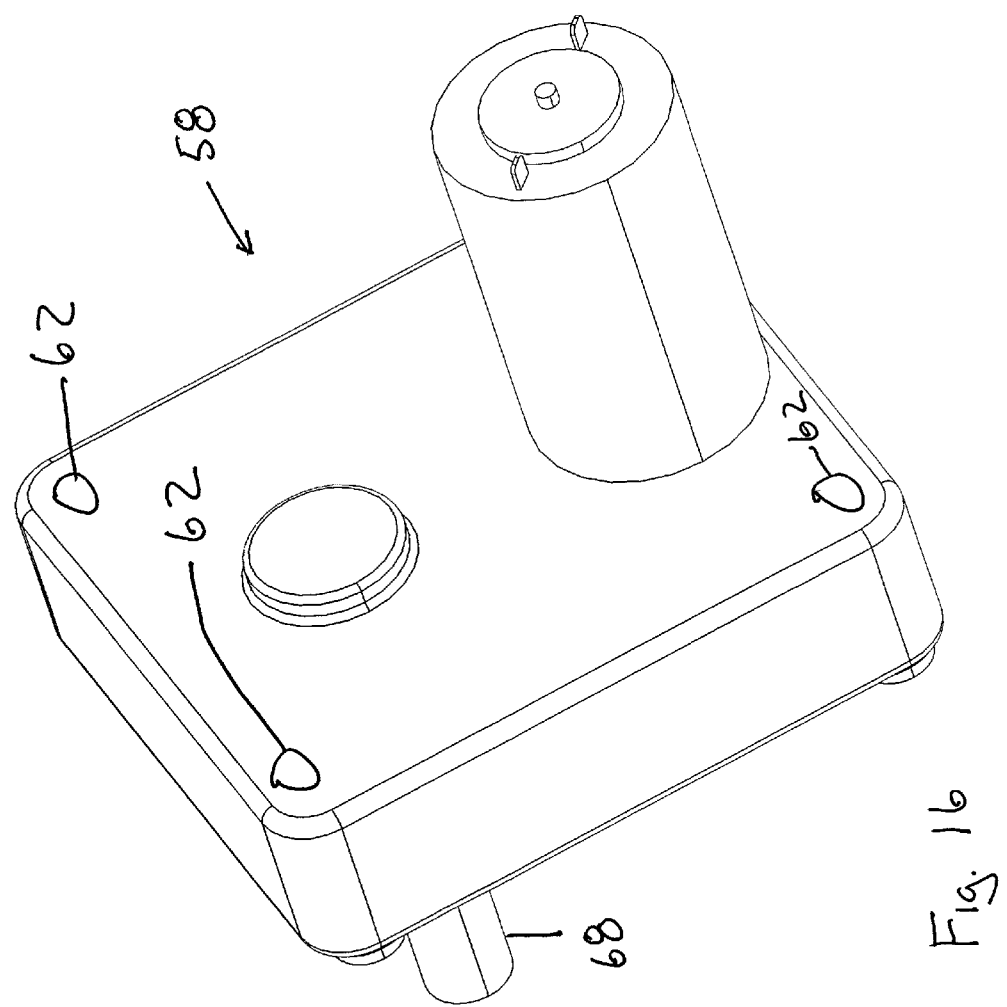
FIG. 16 is perspective view of a motor assembly according to the present invention.
Figure 17:
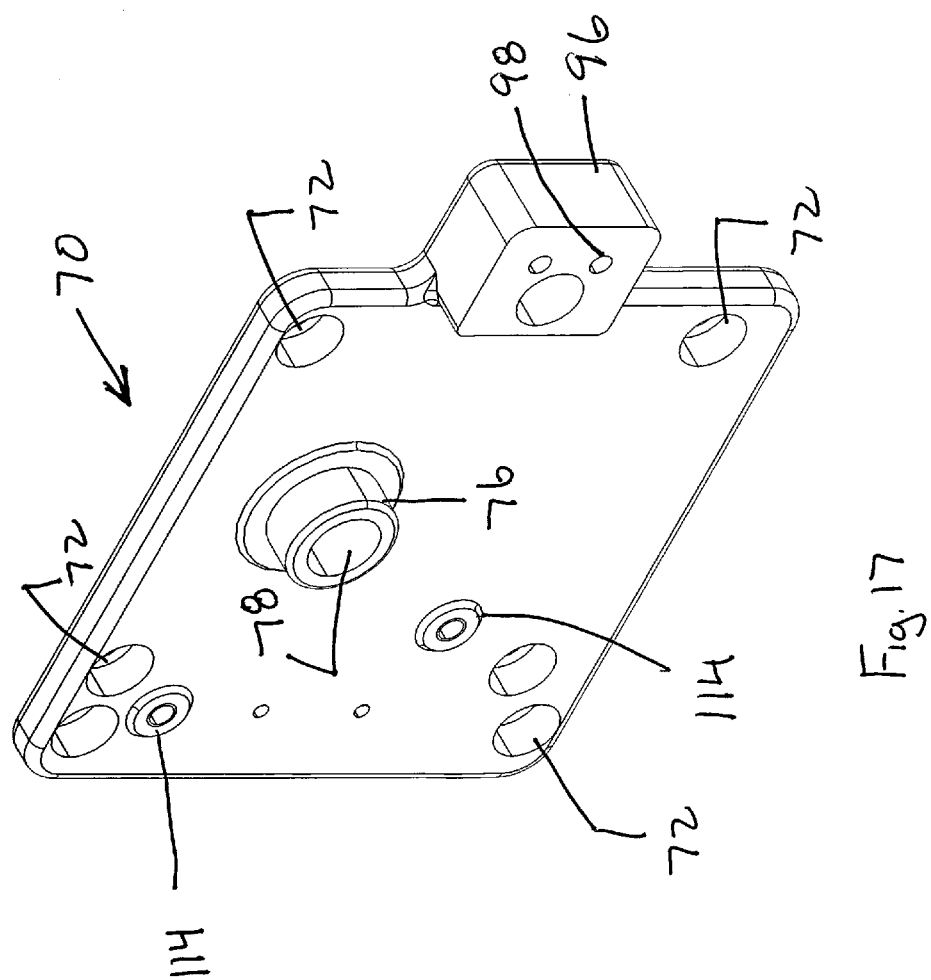
FIG. 17 is perspective view of a component plate according to the present invention.
Figure 18:
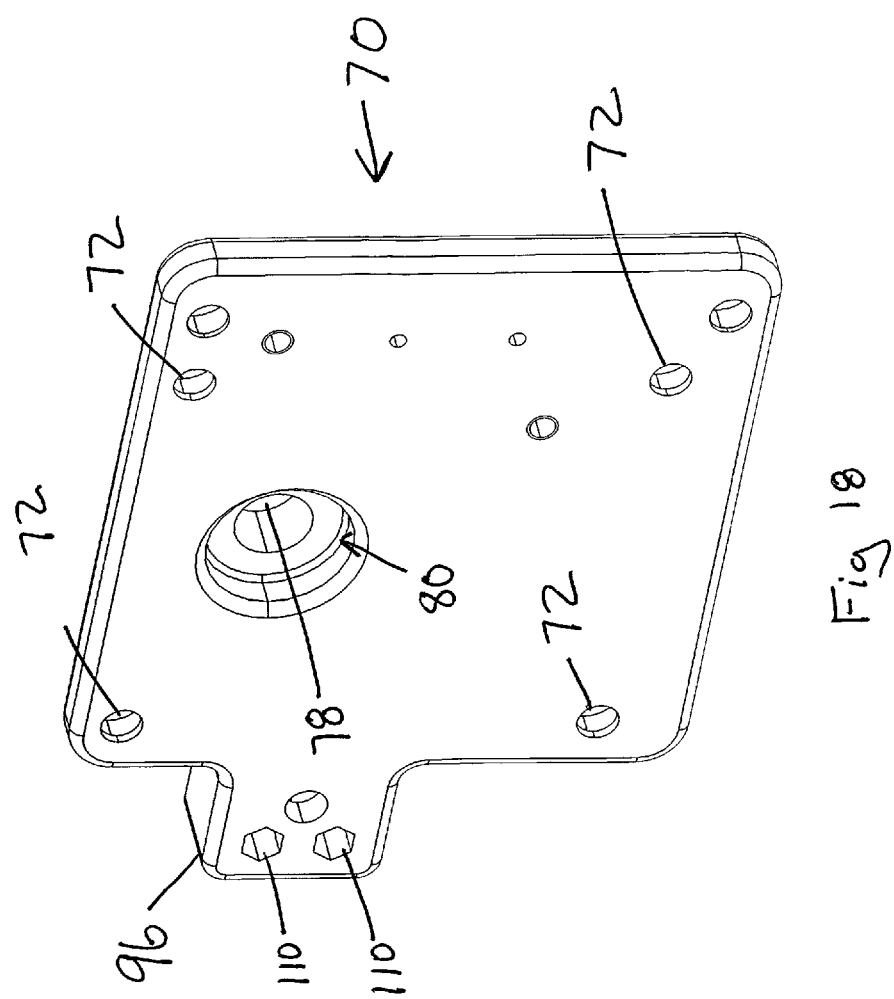
FIG. 18 is perspective view of a component plate according to the present invention.

FIGS. 10-14 show device 50 which is a fourth embodiment of the parking brake engagement indicator of the present invention. The device 50 incorporates many of the components of the third embodiment shown in FIGS. 3-9. FIGS. 10-14 show a main housing made up of a first half 52 and a second half 54. The first half 52 of the main housing is attached to a mounting bracket 56 for mounting in a vehicle similar to the embodiments shown in FIGS. 1-2. A motor assembly 58 attaches within the first half 52 of the main housing. The first half 52 of the main housing includes motor posts 60 which align with motor holes 62 of the motor assembly 58 for attachment of the motor assembly 58 to the motor posts 60 of the first half 52 of the main housing using fasteners. In this way, the motor assembly 58 is mounted within the main housing. The motor assembly 58 is shown in FIGS. 15-16. The motor assembly 58 includes a motor housing 64 that houses an electric motor connected to gearing, as known in the art. An example is model MOD-7000D-DCM by Mutiproducts Company. Extending from the motor housing 64 is a motor hub 66 with a clutch shaft 68. The clutch shaft 68 is connected to the gearing within the motor housing 64, so that the clutch shaft 68 is rotated by the motor.

FIGS. 10-14 and 17-18 show a component plate 70 for attachment of different components used for the device 50. The component plate 70 has plate holes 72 which align with the motor holes 62. The same fastener can be used at each of the aligned plate hole 72 and motor hole 62 to mount the component plate 70 and motor assembly 58 to the motor posts 60 of the first half 52 of the main housing. The fastener 74 is shown in FIG. 6. The component plate 70 includes a plate hub 76 with a shaft hole 78 to allow the clutch shaft 68 to pass. The plate hub 76 includes a hub recess 80 to receive the motor hub 66. The component plate 70 includes a circuit board 82 and electronic receptacle 84 attached to the component plate 70. The circuit board 82 provides the firmware and software to operate the device 50, which includes operation of limit switches and the motor of the motor assembly. The electronic receptacle 84 is connected to the circuit board 82 and is used as a connection point for electrical power to operate the device 50. The electronic receptacle 84 provides a connection for receiving a signal from the parking brake of a vehicle, receiving a signal from the operator's door of a vehicle, for programming of the circuit board 82 and for the transfer of data to and from the device 50.

Figure 19:
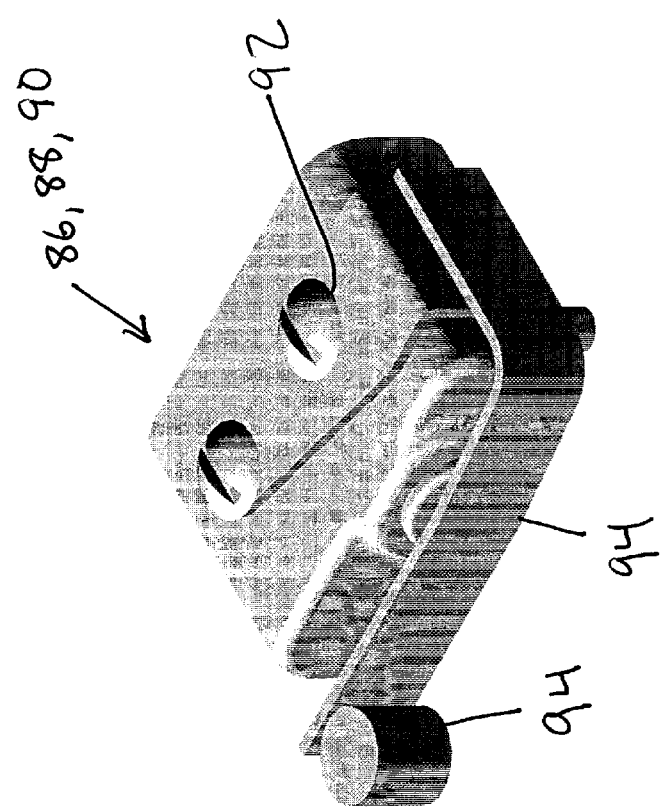
FIG. 19 is perspective view of a limit switch according to the present invention.
Figure 20:
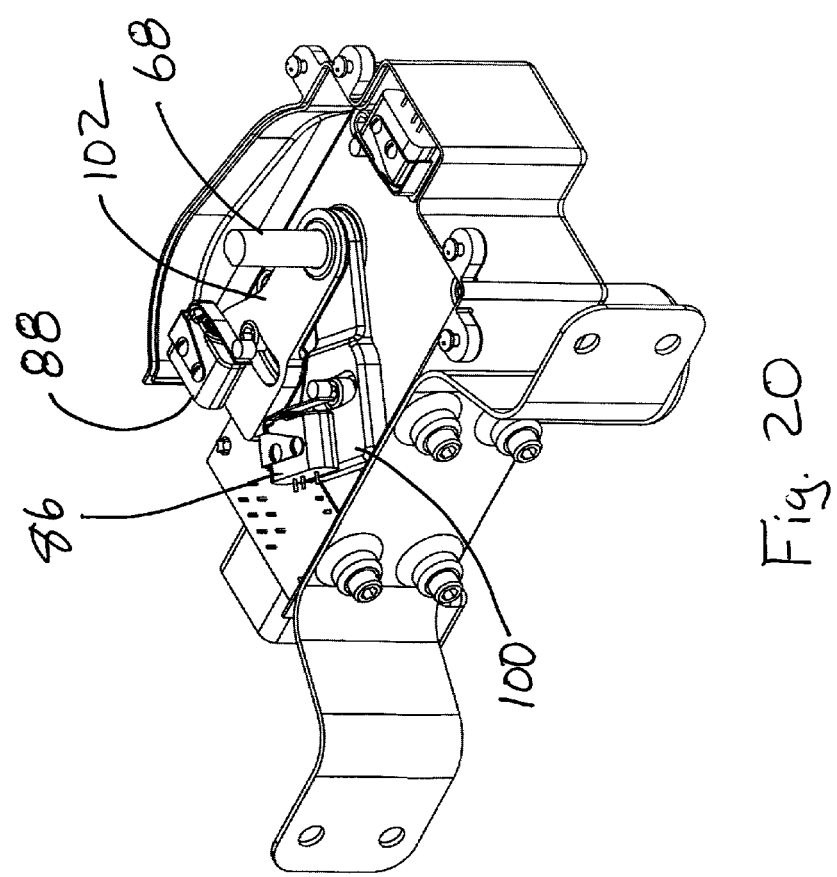
FIG. 20 is perspective view of a fourth embodiment according to the present invention.
Figure 21:
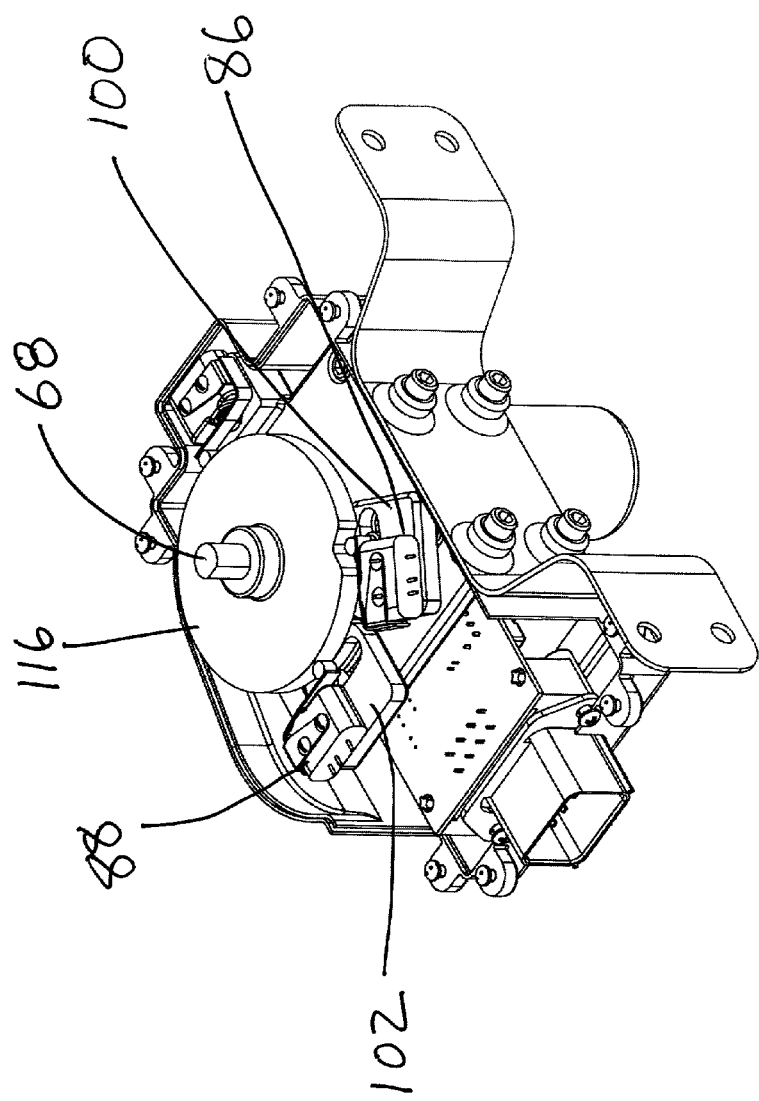
FIG. 21 is perspective view of a fourth embodiment according to the present invention.
Figure 22:
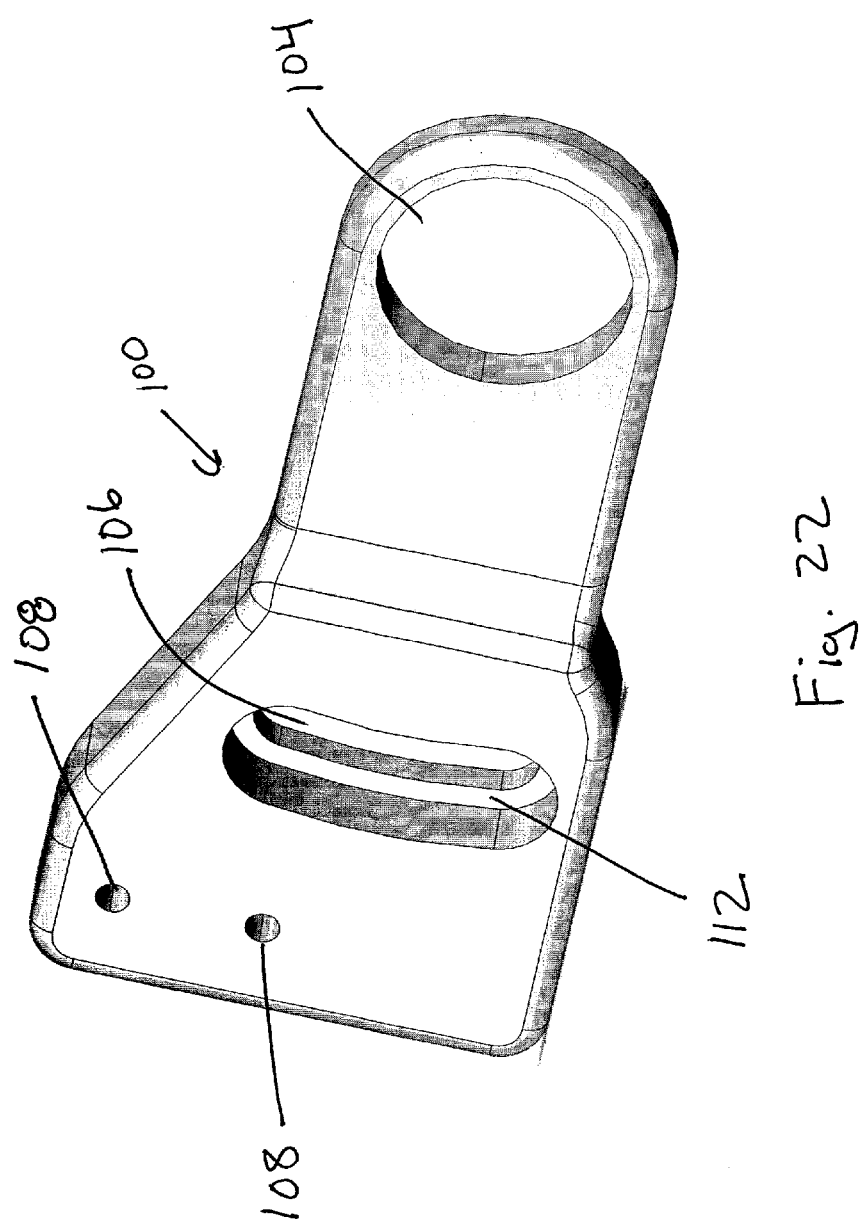
FIG. 22 is perspective view of a first mount according to the present invention.
Figure 23:
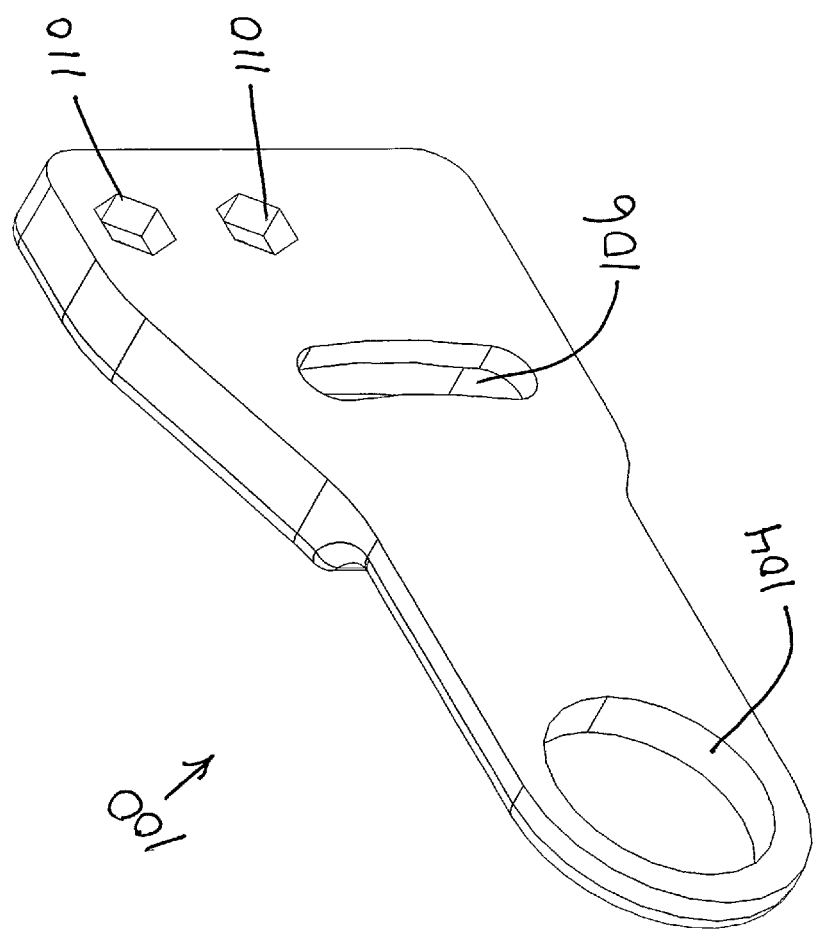
FIG. 23 is perspective view of a first mount according to the present invention.
Figure 24:
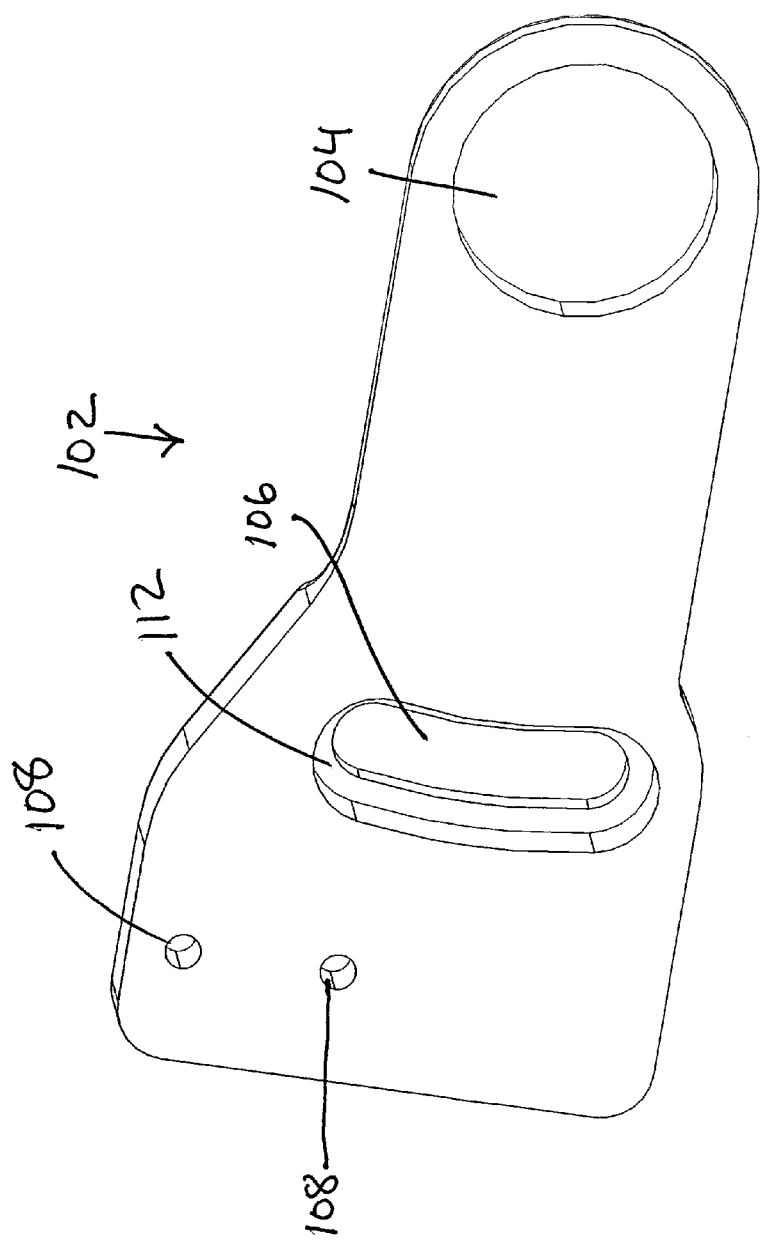
FIG. 24 is perspective view of a second mount according to the present invention.
Figure 25:
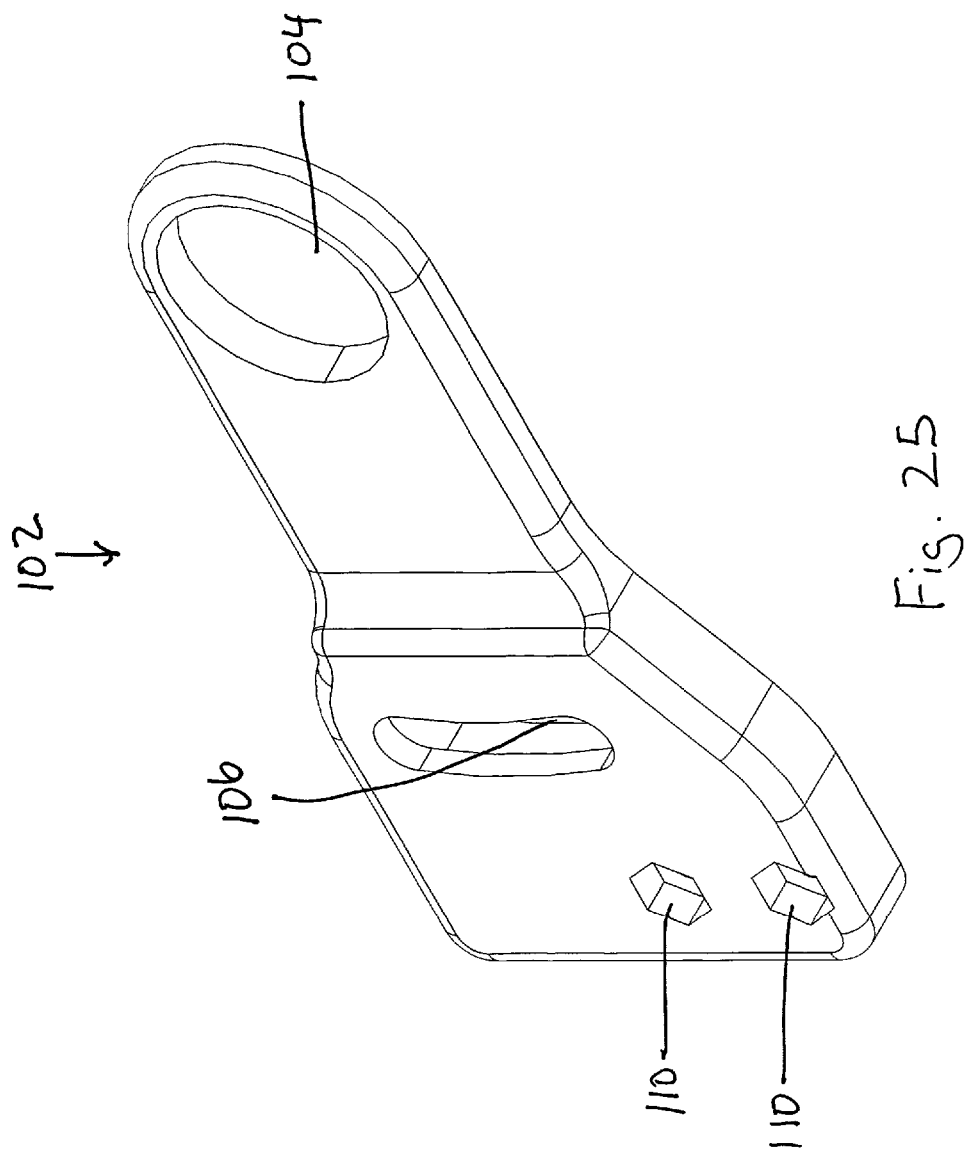
FIG. 25 is perspective view of a second mount according to the present invention.
Figure 26:
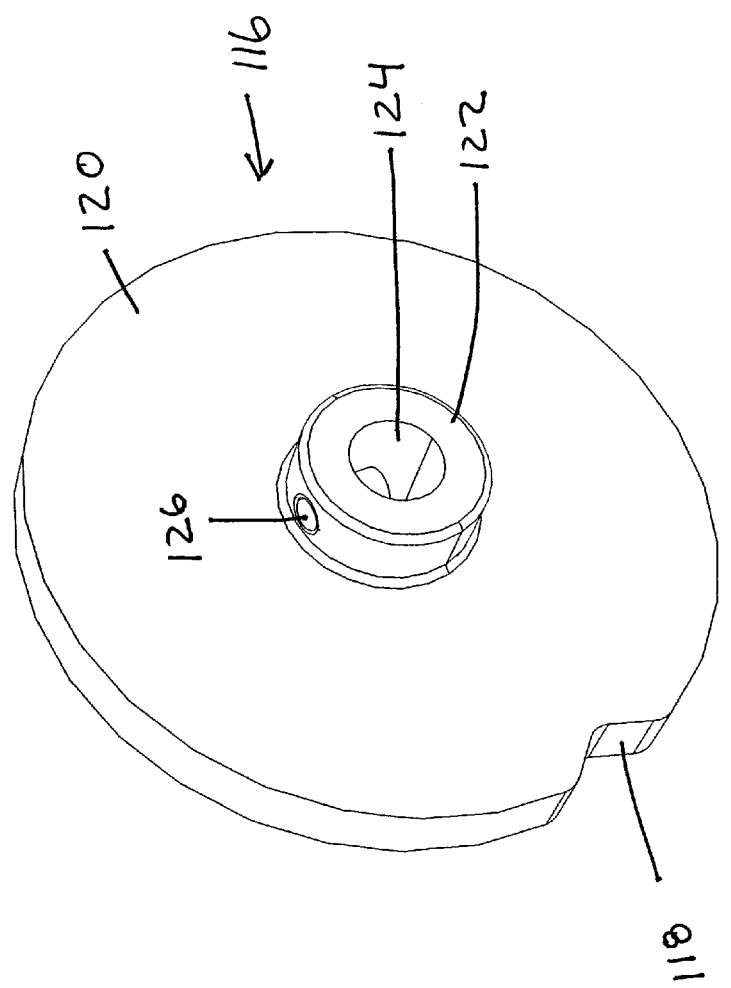
FIG. 26 is perspective view of a limit switch cam according to the present invention.
Figure 27:
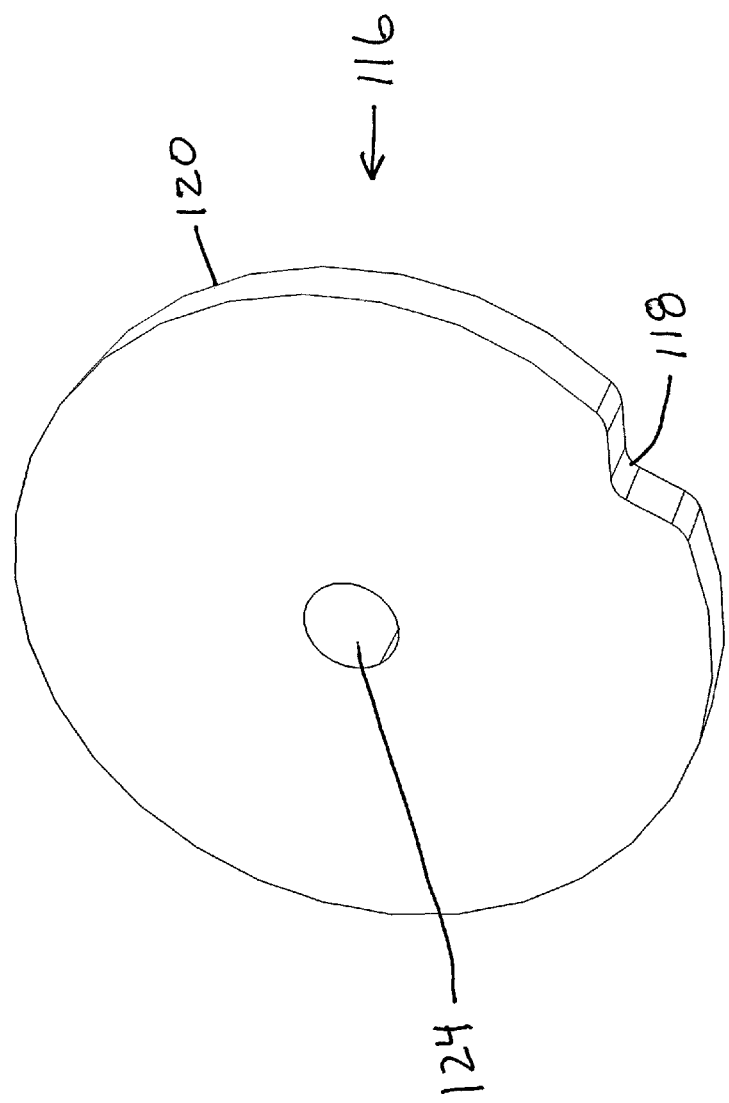
FIG. 27 is perspective view of a limit switch cam according to the present invention.

There are three limit switches mounted to directly to the component plate 70. The three limit switches include a first switch 86, second switch 88 and an overrun switch 90. An example of a limit switch is shown in FIG. 19. Each limit switch includes two mounting holes 92 and a limit lever 94. The overrun switch 90 is mounted to a limit switch tab 96 on the component plate 70 that has mount holes 98. The first switch 86 is mounted to a first mount 100 shown in FIGS. 20-21. The second switch 88 is mounted to a second mount 102 shown in FIGS. 20-21. The first mount 100 of FIGS. 22-23 and the second mount 102 of FIGS. 24-25, each include a shaft hole 104, adjustment slot 106 and mounting holes 108. Each mounting hole 108 includes a nut recess 110 of the backside of the first mount 100 and second mount 102. The mounting holes 108 of the first mount 100 and second mount 102 are aligned to match with mounting holes 92 on the first switch 100 and second switch 102. The shaft hole 104 of the first mount 100 and second mount 102 fits over the plate hub 76, such that the first mount 100 and second mount 102 can rotate about the plate hub 76. The adjustment slot 106 of each of the first mount 100 and the second mount 102 are a curved shape and include a recessed surface 112. A fastener is used within the adjustment slot 106 and against the recessed surface 112 to secure the first mount 100 and the second mount 102 to the component plate 70 using holes 114. The curved shape of the adjustment slot 106 allows for rotation of the first mount 100 and the second mount 102 without changing the position of the hole 114 on the component plate 70 in relationship to the fastener and the adjustment slot 106. The first mount 100 and the second mount 102 are shaped with a reduction of material near the shaft hole 104 as shown in FIGS. 22 and 25 to allow the first mount 100 and the second mount 102 to interact with each other as show in FIGS. 20-21. The shape of the first mount 100 and the second mount 102 allows them to be mounted to the component plate 70, while minimizing the distance required between the component plate 70 and a limit switch cam 116. FIGS. 26-27 show a limit switch cam 116 with limit switch notch 118. FIG. 26 shows the front 120 of the limit switch cam 116 which includes a cam hub 122 with shaft hole 124 and a set screw hole 126 in the cam hub 122 leading to the shaft hole 124. The shaft hole 124 of the limit switch cam 116 fits over the clutch shaft 68. The limit switch cam 122 is secured to the clutch shaft 68 by screwing a set screw into the set screw hole 126 of the cam hub 122. The limit switch notch 118 is formed to interact with the limit lever 94 of the limit switches.

Figure 28:
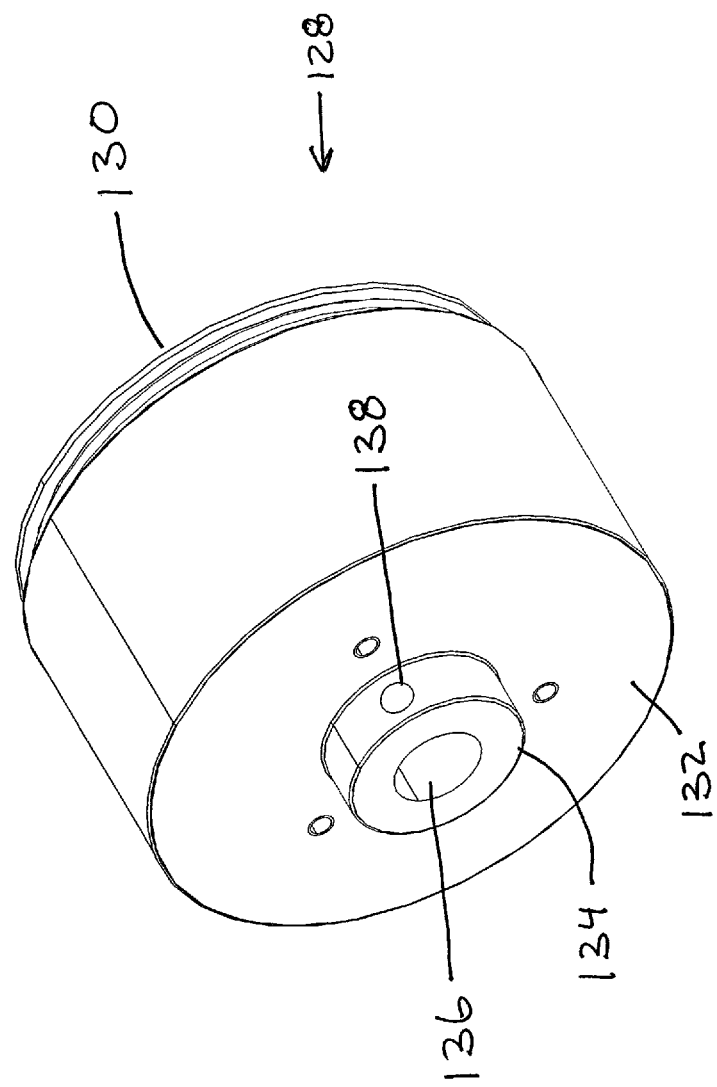
FIG. 28 is perspective view of a spring clutch according to the present invention.
Figure 29:
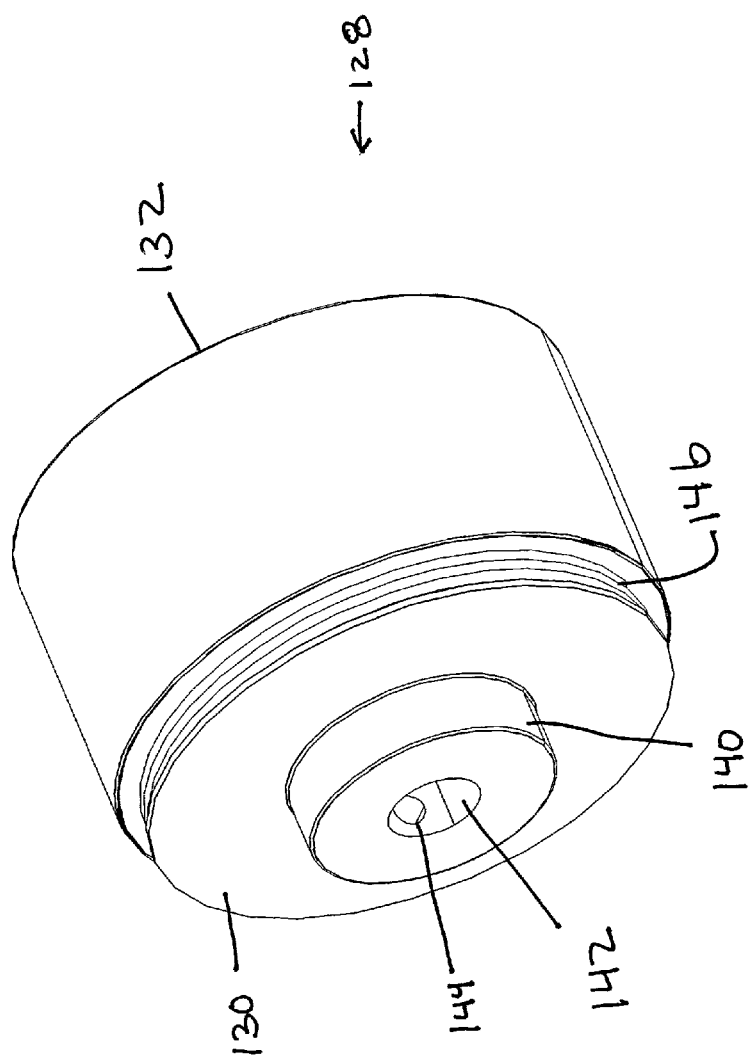
FIG. 29 is perspective view of a spring clutch according to the present invention.

FIGS. 28-29 show a spring wrapped slip clutch 128 known in the art which includes a front end 130 and a rear end 132. An example of a spring wrapped slip clutch is model S9940Y-SWC22A06 by Stock Drive Products/Sterling Instruments. The rear end 132 includes a rear hub 134 with a shaft hole 136 and a set screw hole 138 leading to the shaft hole 136 of the rear hub 134. The slip spring clutch 128 is mounted to the clutch shaft 68 by inserting the end of the clutch shaft 68 into the shaft hole 136 of the rear hub 134. A set screw is used in the set screw hole 138 to secure the rear hub 134 and the clutch 128 to the clutch shaft 68. The front end 130 includes a front hub 140 with a shaft hole 142 and a set screw hole 144 leading to the shaft hole 142 of the front hub 140. FIGS. 28-29 also show the spring 146 of the clutch 128. FIG. 14 shows a bar shaft 148 that fits into the shaft hole 142 of the front hub 140 and is secured using a set screw in the set screw hole 144.

The second half 54 of the main housing includes a cavity 150 within a housing hub 152 to receive the front end 130 of the clutch 128. The second half 54 of the main housing mounts to the first half 52 of the main housing using the connection tabs 154 and fasteners. The housing hub 152 includes a hub hole 156 to receive the front hub 140 of the clutch 128, so that the front hub 104 with set screw hole 144 is exposed on the outside of the main housing. Also extending out from the main housing is the bar shaft 148 from the front hub 104. A safety bar 158 is shown to be attached to the bar shaft 148. The safety bar 158 includes a first section 160 and second section 162. The first section 160 includes a shaft hole 164 with a set screw hole 166 leading to the shaft hole 164. The first section 160 connects to the bar shaft 148 and is secured by a set screw using the set screw hole 166. The second section 162 is connected to the first section 160 using a spring loaded hinge 168. The spring loaded hinge 168 provides a break away point if the operator has to exit the vehicle in an emergency. The clutch 128 is to prevent damage to the rest of the device 50, if the safety bar 158 is forced rotate in a way that would cause damage. The clutch 128 will protect the motor from burning out due to the safety bar 158 being blocked by an object that will not allow the safety bar 158 to reach its predetermined stopping point at one of the limit switches.

The device 50 is mounted in a vehicle similar to FIGS. 1-2, such that the safety bar 158 impedes the operator from leaving the vehicle, if the parking brake has not been engaged. The safety bar 158 acts as a parking brake engagement indicator, where it is not in the way of the operator, when the parking brake is engaged. When the device 50 is operational, the circuit board 82 provides power to the motor. The circuit board 82 commands movement of the motor based on the situation. The motor can rotate the clutch shaft 68 in both the clockwise and counterclockwise directions. Rotation of the clutch shaft 68 causes the limit switch cam 116 to rotate. Rotation of the motor is halted when the limit switch notch 118 engages one of the limit levers 94 of the first switch 86 or second switch 88. The first switch 86 and second switch 88 are used together to limit travel of the motor and hence the safety bar 158 through a predetermined range of rotation. Rotation of the motor is also halted and the system is shut done when the limit switch notch 118 engages the limit lever 94 of the overrun switch 90. The overrun switch 90 is used as a backup in case one or both of the first switch 86 or second switch 88 would fail.

Figure 30:
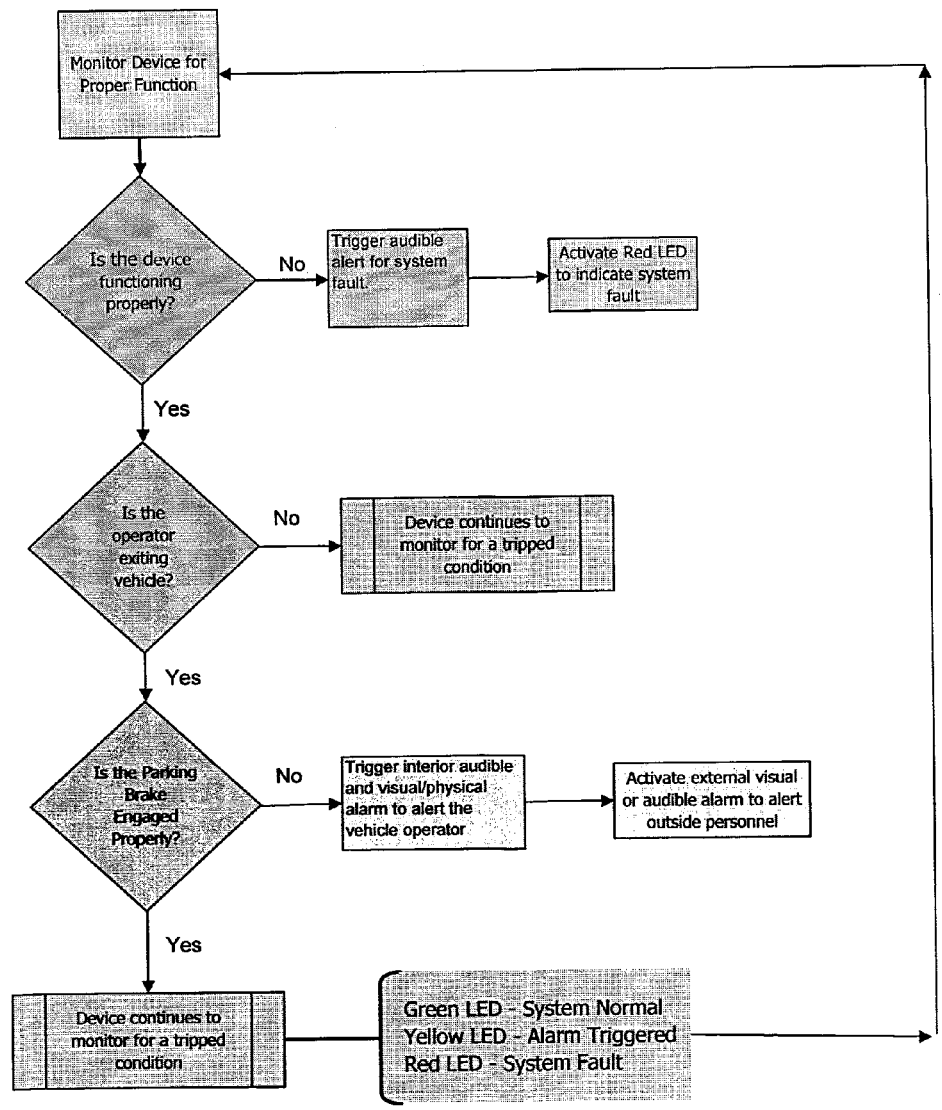
FIG. 30 is flow diagram of the logic of a circuit board according to the present invention.

FIG. 30 shows a flow diagram of the circuit board operation of the device 50. The device 50 monitors if the parking brake is engaged. When the device 50 is powered up, the firmware and software of the circuit board 82 checks and monitors the device 50 for proper function when powered. If it is determined that the device 50 is not functioning properly, an audible alert sounds indicating a system fault and a red LED on the device 50 is activated to indicate the system fault. If it is determined that the device is functioning properly, the device 50 will look to see if the operator is exiting the vehicle by determining if the operator door on the vehicle that the operator uses is open. A door sensor to determine if the operator door on the vehicle is open or closed is connected to the circuit board 82 through the electronic receptacle 84. The door sensor can be as simple as a ground connection. If the operator door is closed, the device 50 will continue to monitor status the status of the device 50 for any changes in its function or the opening of the operator door. If the operator door is open, the device 50 will check to see if the parking brake is engaged. A parking brake sensor to determine if the parking brake of a vehicle is engaged is connected to the circuit board 82 through the electronic receptacle 84. The parking brake sensor can be as simple as a ground connection. If the park brake is not engaged and the operator door is open, the safety bar 158 will be rotated from a unblocking position into a position so that the safety bar 158 blocks the operator from exiting the vehicle. In this way the operator should notice the safety bar 158 and be reminded the parking brake is not engaged. Also, an interior audible alarm and visual alarm, as well as exterior audible and visual alarms can be part of and activated by the circuit board 82. Once the parking brake is set, the device 50 will sense the condition and the safety bar 158 will rotate back to the unblocking position, so the exit path of the operator is no longer blocked and any connected alarms deactivated. If the park brake is engaged, the safety bar 158 will remain at the unblocking position and the device 50 will continue to monitor for a tripped condition. The first switch 86 and second switch 88 are the stops for the safety bar 158 to be at the unblocking position and the blocking position and are set based on the mounting position of the device 50. The device 50 can include a green light to indicate the device is in a normal condition, a yellow light to indicate an alarm has been triggered and a red light to indicate a fault with the device 50. Another option is to a have a date and time recorder along with a counter that programed in the circuit board 82 to record date, time and number of times the parking brake was not engaged when the operator's door was opened. The recorded data of date, time and number of times the parking brake was not engaged when the operator's door was opened then could be downloaded using a computer device by connecting to the electronic receptacle 84.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A device as a parking brake engagement indicator on a vehicle, the device comprising:
    a motor assembly with a motor, said motor attached to a clutch shaft such that said motor can rotate said clutch shaft, said motor adapted to be mounted in the vehicle;
    a component plate, said component plate including a shaft hole to allow said clutch shaft to pass;
    a circuit board, said circuit board to provide operation of said device including said motor;
    an electronic receptacle, said electronic receptacle adapted to provide a connection between said circuit board and a parking brake of the vehicle and adapted to provide a connection between said circuit board and an operator's door of the vehicle;
    a limit switch cam mounted to said clutch shaft, said cam including a limit switch notch;
    a first switch attached to said component plate, said first switch connected to said circuit board, said first switch including a lever to engage said limit switch notch to stop rotation of said motor and said clutch shaft at a first predetermined point;
    a second switch attached to said component plate, said second switch connected to said circuit board, said second switch including a lever to engage said limit switch notch to stop rotation of said motor and said clutch shaft at a second predetermined point;
    a slip clutch, said slip clutch mounted to said clutch shaft;
    a bar shaft connected to said slip clutch, said bar shaft connected to said slip clutch such that if the motion of said bar shaft is impeded then said slip clutch will protect said motor by allowing said clutch shaft to slip; and
    a safety bar connected to said bar shaft, said connection of said safety bar to said bar shaft adapted within the vehicle to provide a blocking position to indicate to a driver of non-engagement of the parking brake of the vehicle and to provide an unblocking position to indicate to the driver of engagement of the parking brake of the vehicle, said safety bar connected such that said safety bar will travel between said first predetermined point for said blocking position and said second predetermined point for said unblocking position.

2. The device of claim 1, further including an overrun switch attached to said component plate, said overrun switch connected to said circuit board, said overrun switch including a lever to engage said limit switch notch to stop rotation of said motor.

3. The device of claim 1, further including a main housing, said housing including a first half and a second half, said motor mounted to one of said first half and a second half.

4. The device of claim 1, further including a vehicle mount attached to said device adapted for mounting said device to the vehicle.

5. The device of claim 1, wherein safety bar includes a first section and second section, said first section including a shaft hole for attachment to said bar shaft; said second section connected to said first section by a spring loaded hinge.

6. The device of claim 1, wherein said circuit board includes alarm modes to indicate if an operator exited the vehicle without setting a parking brake of the vehicle.

7. The device of claim 6, further including status information devices connected to and triggered by said circuit board to indicate a normal operating condition, to indicate an alarm of said alarm modes has been triggered and to indicate a device system fault.

8. The device of claim 1, further including a counter connected to said circuit board to indicate how many times an operator exited the vehicle without setting a parking brake of the vehicle.

9. The device of claim 1, wherein said motor assembly includes gearing between said motor and said clutch shaft.

10. The device of claim 1, wherein said motor assembly includes a motor hub from which said clutch shaft protrudes and that fits inside a cavity of said component plate; wherein said component plate includes a plate hub with said shaft hole of said component plate from which said clutch shaft protrudes; wherein said limit switch cam includes a cam hub with a set screw hole leading to said cam hub for attachment to said clutch shaft; and wherein said slip clutch includes a rear hub with a set screw hole leading to said rear hub for attachment to said clutch shaft and said slip clutch includes a front hub with a set screw hole leading to said front hub for attachment to said bar shaft.

11. The device of claim 1, further including an operator's door sensor and a parking brake sensor wired to said circuit board.

12. The device of claim 11, wherein said circuit board is configured electronically to provide power to said motor, to check if the parking brake is engaged, to check if the operator's door is open; command the motor to rotate based on status of parking brake and operator's door.

13. The device of claim 1, further including adjustable mounts for said first switch and said second switch which attached to said component plate.

14. The device of claim 13, wherein each of said adjustable mounts includes a shaft hole to fit over said plate hub such that said adjustable mounts rotate about said plate hub; wherein said adjustable mounts including a slot for securing said adjustable mounts; and wherein said adjustable mounts are shaped to fit together to reduce space needed between said component plate and said limit switch cam.

15. The device of claim 1, further including an overrun switch attached to said component plate, said overrun switch connected to said circuit board, said overrun switch including a lever to engage said limit switch notch to stop rotation of said motor; wherein safety bar includes a first section and second section, said first section including a shaft hole for attachment to said bar shaft; said second section connected to said first section by a spring loaded hinge; wherein said motor assembly includes a motor hub from which said clutch shaft protrudes and that fits inside a cavity of said component plate; wherein said component plate includes a plate hub with said shaft hole of said component plate from which said clutch shaft protrudes; wherein said limit switch cam includes a cam hub with a set screw hole leading to said cam hub for attachment to said clutch shaft; and wherein said slip clutch includes a rear hub with a set screw hole leading to said rear hub for attachment to said clutch shaft and said slip clutch includes a front hub with a set screw hole leading to said front hub for attachment to said bar shaft.

16. The device of claim 15, further including an operator's door sensor and a parking brake sensor wired to said circuit board.

17. The device of claim 16, wherein said circuit board is configured electronically to provide power to said motor, to check if the parking brake is engaged, to check if the operator's door is open; command the motor to rotate based on status of parking brake and operator's door.

\* \* \* \* \*